(12) United States Patent
Karsdon et al.

(10) Patent No.: US 12,496,444 B2
(45) Date of Patent: Dec. 16, 2025

(54) ELECTRICAL MUSCLE CONTROLLER SYSTEM FOR UTERINE CONTRACTION MONITORING AND MODULATION

(71) Applicant: e-Bio Corp., Baldwin, NY (US)

(72) Inventors: Jeffrey Karsdon, Baldwin, NY (US); Denis Schapira Wajman, New York, NY (US); Frederick Naftolin, Woolbridge, CT (US)

(73) Assignee: e-Bio Corp., Baldwin, NY (US)

( * ) Notice: Subject to any disclaimer, the term of this patent is extended or adjusted under 35 U.S.C. 154(b) by 506 days.

(21) Appl. No.: 17/761,174

(22) PCT Filed: Sep. 23, 2020

(86) PCT No.: PCT/US2020/052307
§ 371 (c)(1),
(2) Date: Mar. 16, 2022

(87) PCT Pub. No.: WO2021/061843
PCT Pub. Date: Apr. 1, 2021

(65) Prior Publication Data
US 2023/0405317 A1    Dec. 21, 2023

Related U.S. Application Data

(60) Provisional application No. 62/912,286, filed on Oct. 8, 2019, provisional application No. 62/906,406, filed
(Continued)

(51) Int. Cl.
*A61N 1/36* (2006.01)
*A61N 1/05* (2006.01)
*A61N 1/375* (2006.01)

(52) U.S. Cl.
CPC ....... *A61N 1/36007* (2013.01); *A61N 1/0524* (2013.01); *A61N 1/375* (2013.01)

(58) Field of Classification Search
CPC ................... A61N 1/36007; A61N 1/0524
See application file for complete search history.

(56) References Cited

U.S. PATENT DOCUMENTS 8,914,111 B2    12/2014   Haessler
8,972,028 B2 *   3/2015   Garfield ............. A61N 1/05
                                                607/138
(Continued)

FOREIGN PATENT DOCUMENTS

WO    WO 2018/119052 A1    6/2018
WO    WO 2019/146901 A1    8/2019

OTHER PUBLICATIONS

European Patent Office, Extended European Search Report, European Patent Application No. 20867893.8, Sep. 5, 2023, eight pages.
(Continued)

*Primary Examiner* — Kennedy Schaetzle
(74) *Attorney, Agent, or Firm* — FENWICK & WEST LLP

(57) ABSTRACT

A medical device is disclosed for monitoring and modulating uterine contractions. The medical device may include a uterine pacemaker and an intravaginal electrode carrier, which may both be located within the body. The intravaginal electrode carrier includes sensing and modulating electrodes that measure uterine electroactivity and apply electrical modulation, respectively. The uterine pacemaker receives the measured uterine electroactivity from the intravaginal electrode carrier and generates the electrical modulation applied by the modulating electrodes. The electrical modulation may be used to inhibit or induce uterine contractions. The intravaginal electrode carrier may be used in addition or as an alternative to an external uterine muscle activity monitor (e.g., a tocodynamometer) for a more accurate measure of uterine contractions that is noninvasive.

18 Claims, 25 Drawing Sheets

Related U.S. Application Data on Sep. 26, 2019, provisional application No. 62/904,585, filed on Sep. 23, 2019, provisional application No. 62/904,579, filed on Sep. 23, 2019, provisional application No. 62/904,577, filed on Sep. 23, 2019, provisional application No. 62/904,586, filed on Sep. 23, 2019, provisional application No. 62/904,587, filed on Sep. 23, 2019, provisional application No. 62/904,581, filed on Sep. 23, 2019.

(56) References Cited

U.S. PATENT DOCUMENTS

| | | |
|---|---|---|
| 2002/0010494 A1 | 1/2002 | Policker et al. |
| 2006/0189882 A1 | 8/2006 | Thomas |
| 2007/0270921 A1 | 11/2007 | Strother et al. |
| 2009/0318914 A1* | 12/2009 | Utley ............... A61B 46/13 606/33 |
| 2010/0222844 A1* | 9/2010 | Troosters ............ A61N 1/0556 607/116 |
| 2013/0261702 A1* | 10/2013 | Garfield ............. A61N 1/0524 607/59 |
| 2014/0065107 A1 | 3/2014 | Lockwood et al. |
| 2014/0288551 A1* | 9/2014 | Bharmi ............. A61N 1/36121 606/41 |
| 2015/0282763 A1 | 10/2015 | Rosenshein |
| 2017/0050041 A1* | 2/2017 | Cosman .................. A61N 1/36 |
| 2017/0157397 A1 | 6/2017 | Lockwood et al. |
| 2019/0046488 A1 | 2/2019 | Rosenblatt et al. |
| 2020/0086110 A1* | 3/2020 | Karsdon ................ A61N 1/05 |

OTHER PUBLICATIONS

PCT International Search Report and Written Opinion, International Application No. PCT/US2020/052307, dated Feb. 9, 2021, 17 Pages.

* cited by examiner

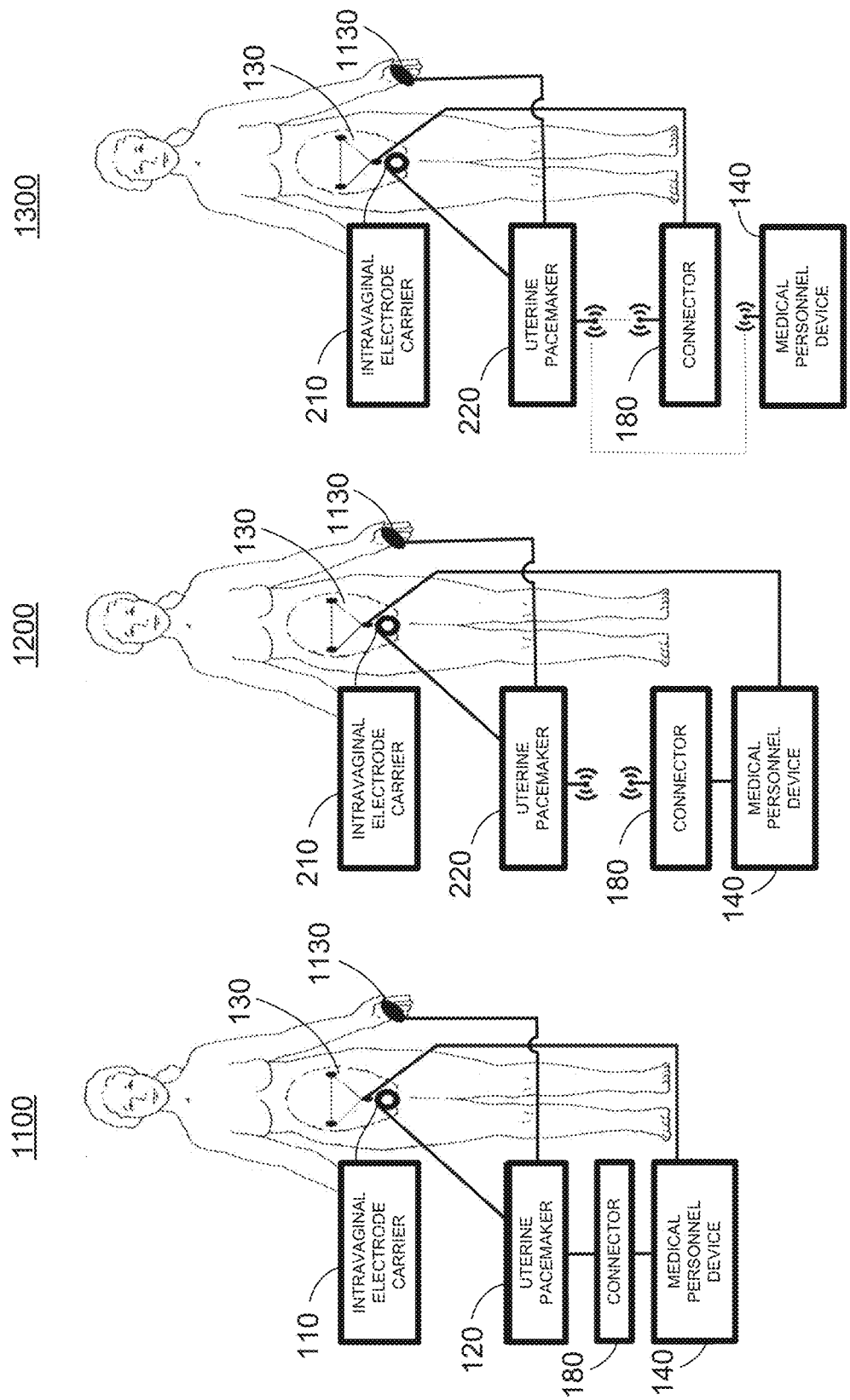

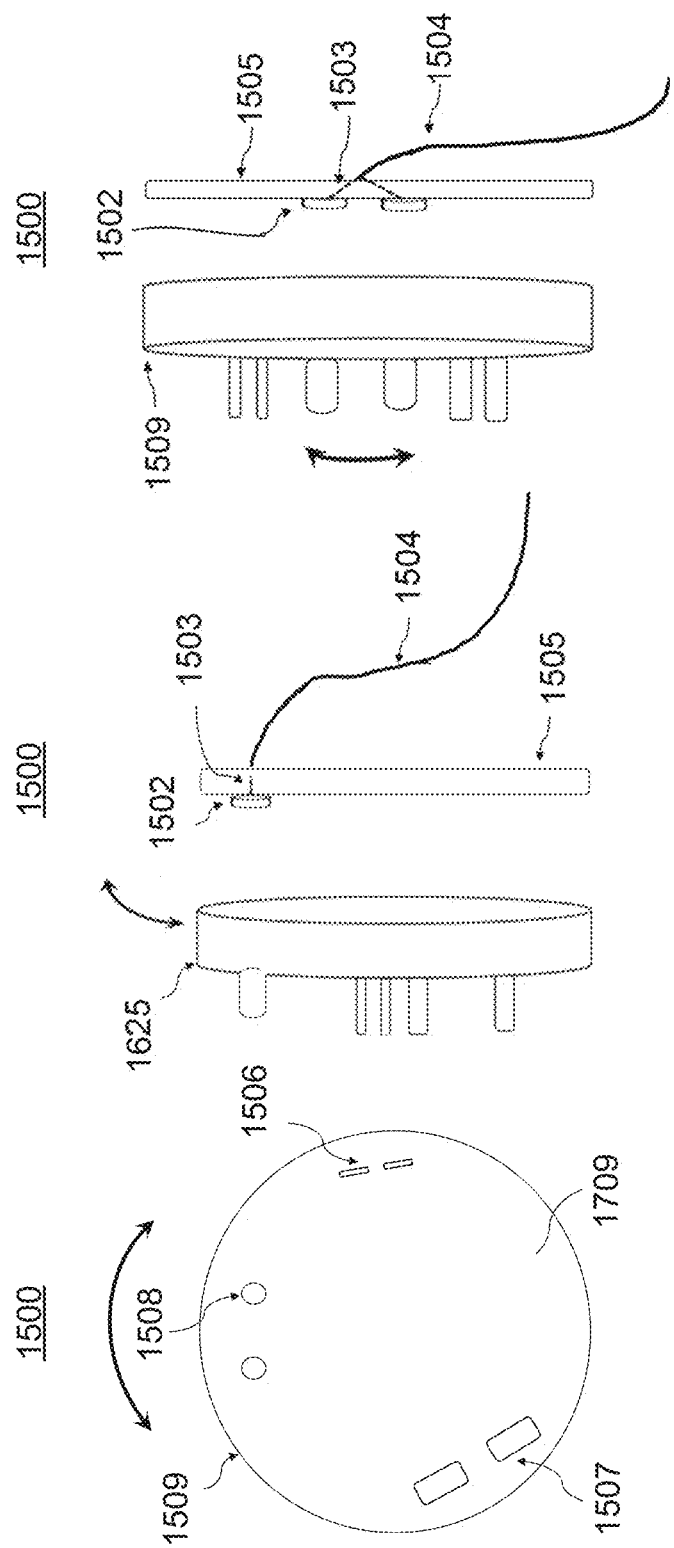

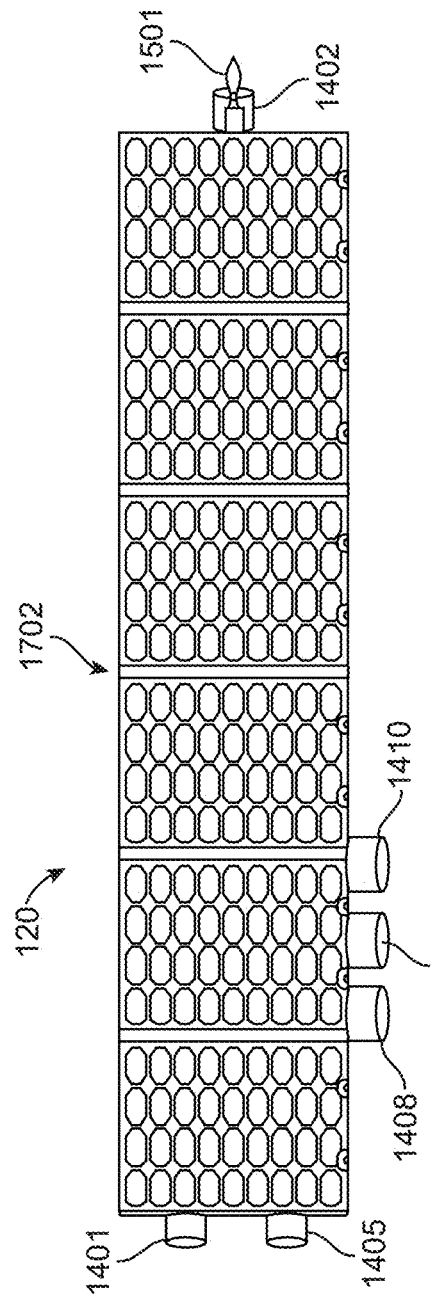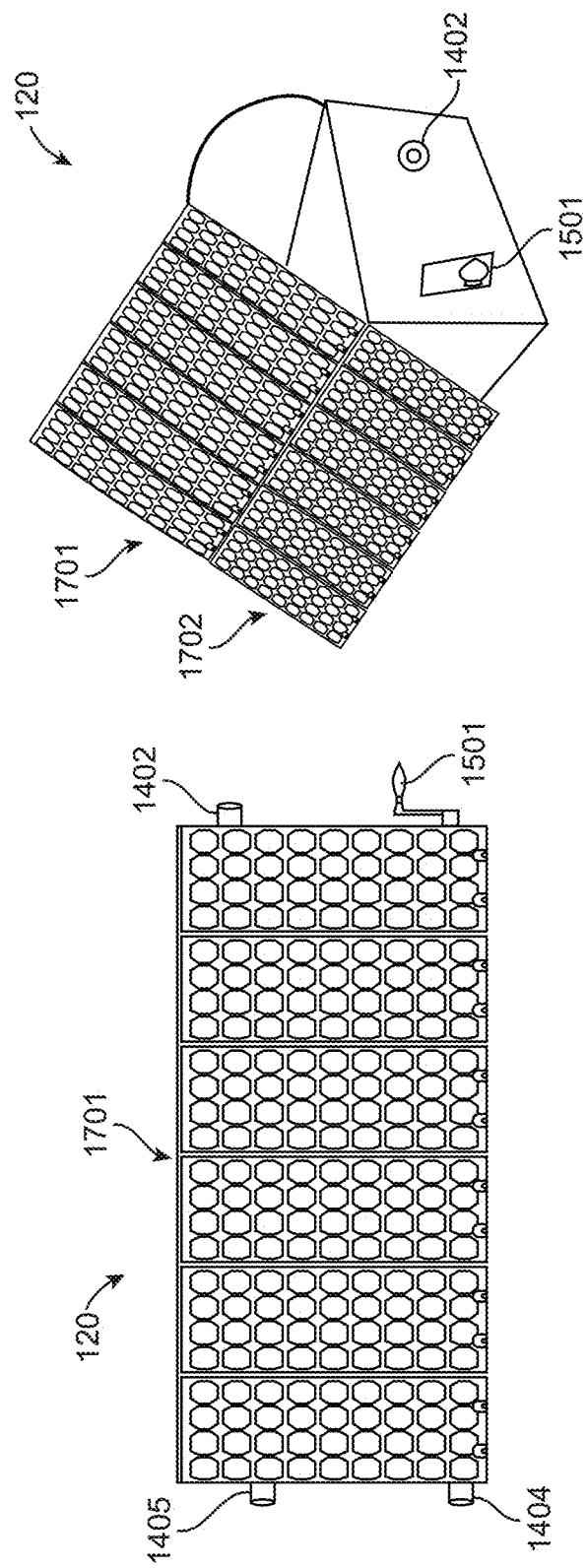

2100

2101
Measure, using one or more sensing electrodes contacting cervico-vaginal tissue of a patient's uterus, electroactivity data of the uterus 2102
Receive the measured electroactivity data 2103
Generate, based on the measured electroactivity data, electrical modulation 2104
Transmit the electrical modulation to one or more modulating electrodes 2105
Apply electrical modulation to the uterus using the one or more modulating electrodes contacting the cervico-vaginal tissue

FIG. 21

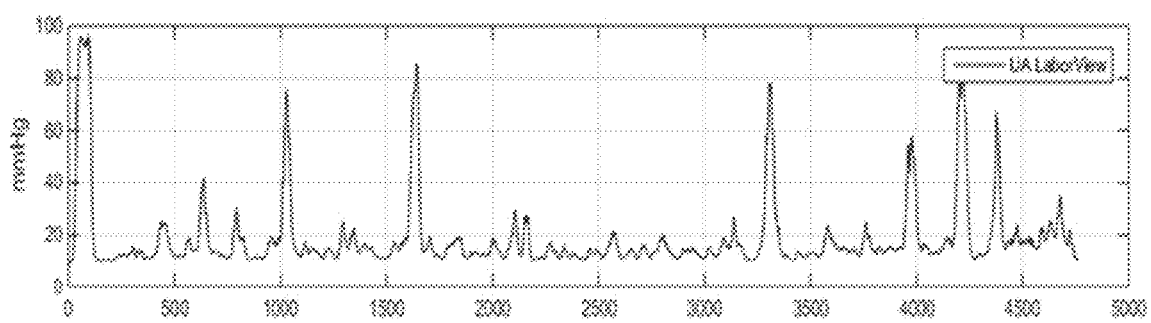
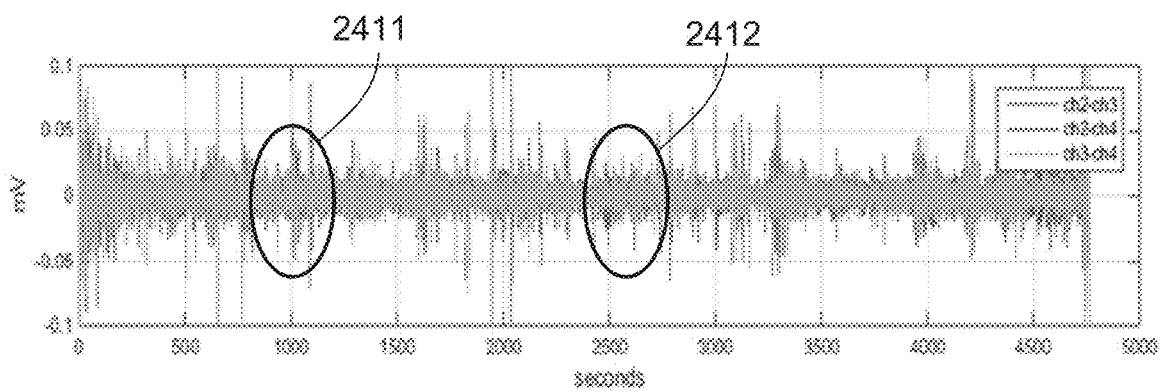
FIG. 24

ELECTRICAL MUSCLE CONTROLLER SYSTEM FOR UTERINE CONTRACTION MONITORING AND MODULATION

CROSS REFERENCE TO RELATED APPLICATIONS

This application is the National Stage of International Application No. PCT/US2020/052307, filed on Sep. 23, 2020, which claims the benefit of and priority to U.S. Provisional Application Nos. 62/904,577, 62/904,579, 62/904,581, 62/904,585, 62/904,586, and 62/904,587, which were filed Sep. 23, 2019, U.S. Provisional Application No. 62/906,406, filed Sep. 26, 2019, and U.S. Provisional Application No. 62/912,286, filed Oct. 8, 2019, which are incorporated by reference in their entireties.

TECHNICAL FIELD

The disclosure generally relates to medical devices, and more specifically, to a medical device for monitoring and modulating muscle (e.g., uterine) contractions.

BACKGROUND

Nearly 10% of the 131.4 million births per year worldwide are premature, totaling 15 million premature births per year. Preterm birth is the most common pregnancy complication, with 20% of all pregnancies at high risk. In the United States alone, 12% of the four million babies, or about one-half million babies, are born premature each year. In addition, preterm birth accounts for 85% of infant mortality (death before 1 year old) and 50% of infant morbidity, i.e. neurological disorders. Complications of premature births may be immediate or lifelong, including perinatal death and breathing, feeding, vision, hearing, and developmental problems for children born prematurely.

Conventional methods to prevent preterm births include pharmaceutical treatment against active pre-term labor (PTL) using nifedipine, terbutaline, atosiban, magnesium, and indomethacin have very serious side effects for both the mother and the baby. In utero treatment is also currently available, which includes corticosteroids and magnesium. However, the side effects of these treatments may also be extensive for both the mother and the baby. And all of these existing treatments also generally have minimal efficacy. Additionally, the use of the progesterone analog 17OH-progesterone for prevention of PTL, as described in the American Journal of Perinatology in 2018, has been shown ineffective, resulting in there being no medical PTL preventative approved by the Federal Drug Administration (FDA) on the market in the United States. Accordingly, there is a great unmet need for treatment and prevention.

Furthermore, uterine muscle activity, including uterine contractions, is conventionally monitored externally for a mother in preterm labor using an abdominally placed mechanical sensor (e.g., a tocodynamometer) or electrical sensors (e.g., electromyography (EMG) or electrohysterography (EHG)). However, internal monitors may produce more accurate measurements than external monitors because of their closer proximity to the uterus. However, internal monitors conventionally require penetrating the wall of the uterus, meaning that they sacrifice safety for increased accuracy.

SUMMARY

A medical device is disclosed for monitoring and modulating muscle function, including uterine smooth muscles. One embodiment is an electroceutical system employed via the placement of intravaginal electrodes (e.g., without tissue penetration) that monitor uterine activity and apply a modulating current for uterine activity regulation. The electroceutical device/system electrically modulates the muscle to control uterine muscle activity such as uterine contractions. Current delivery patterns of the electrical modulation may be set to either thwart contractions or stimulate muscle activity. In one example, the device targets preterm labor by detecting and electrically inhibiting uterine contractions that otherwise would lead to premature delivery. The medical device for treating preterm labor may include an electrical uterine pacemaker and an intravaginal electrode carrier, which may both be located on or within the body (e.g., intravaginally). These configurations allow the system to be used during an acute contraction episode or to be worn by the user over a period of time and during daily activities.

The intravaginal electrode carrier includes sensing and modulating electrodes that measure uterine electroactivity and apply electrical modulation, respectively. The uterine pacemaker receives the measured uterine electroactivity from the intravaginal electrode carrier (e.g., indicating that a contraction is occurring or about to occur), and the pacemaker generates the electrical modulation applied by the modulating electrodes. The electrical modulation may be used to inhibit or induce uterine contractions. This electroceutical control of uterine contractions may reduce the likelihood of preterm births with greater efficacy and less side effects than pharmaceutical intervention. The intravaginal electrode carrier may be used in addition to or as an alternative to an external uterine muscle activity monitor (e.g., a tocodynamometer) for a more accurate measure of uterine contractions that is noninvasive (e.g., contacting only the surface of the cervix). Hence, the intravaginal electrode carrier and uterine pacemaker described herein do not sacrifice safety for increased accuracy. The system may provide an easy-to-use, non-invasive, wearable, and compact system that reversibly provides modulations of uterine contractions.

In one embodiment, a system is disclosed for electroceutical control (i.e., electrical modulation) of uterine contractions. An intravaginal electrode carrier includes a housing that is structured to contact the cervico-vaginal tissue of a patient. The housing may include one or more sensing electrodes that measure electroactivity data of the patient's uterus through the cervico-vaginal tissue. The housing may also include one or more modulating electrodes that apply electrical modulation to the patient's uterus via the cervico-vaginal tissue. The system may also include a uterine pacemaker that is coupled to the intravaginal electrode carrier. The uterine pacemaker may include a uterine monitor configured to receive electroactivity data measured at the one or more sensing electrodes. The uterine pacemaker may also include an electroceutical generator configured to generate electrical modulation based on the measured electroactivity data and transmit the electrical modulation to the modulating electrodes at the intravaginal electrode carrier.

In another embodiment, a system is disclosed for electroceutical control of uterine contractions using an intravaginally wearable device that includes both the intravaginal electrode carrier and the uterine pacemaker. The intravaginal electrode carrier includes a housing that is structured to contact cervico-vaginal tissue. The housing includes one or more sensing electrodes for measuring electroactivity of the patient's uterus and one or more modulating electrodes for applying electrical modulation to the uterus through the cervico-vaginal tissue. The uterine pacemaker is coupled to the sensing and modulating electrodes, and may be included in the same housing with the electrodes. The uterine pacemaker includes a uterine monitor that receives the electroactivity measured by the sensing electrodes and an electroceutical generator. The electroceutical generator generates electrical modulation based on the measured electroactivity data and transmits the generated electrical modulation to the modulating electrodes for application to the patient's uterus. In some embodiments, the housing includes a dispenser that may dispense one or more of a local anesthetic or a conductive gel to improve the conductivity at the sensing and modulating electrodes.

In yet another embodiment, a system is disclosed for electroceutical control of uterine contractions using an intravaginal electrode carrier that includes a housing structured for positioning to be in contact with a patient's cervico-vaginal tissue. The housing may include a main body with a cylindrical shape, electrodes arranged on the main body to contact the cervico-vaginal tissue, balloon platforms attached to and protruding outward from the main body, inflation channel openings on the main body (with one of the inflation channel openings positioned at each of the balloon platforms), and balloons associated with the main body (with one of the balloons coupled to each of the inflation channel openings). The intravaginal electrode carrier may further include electrode leads that are housed within the main body and coupled to the respective electrodes and connectable to a uterine pacemaker. The intravaginal electrode carrier may further include inflation channels housed within the main body, each inflation channel having a hollow tube and coupled to a respective inflation channel opening.

In another embodiment, a system is disclosed for electroceutical control of uterine contractions using an intravaginal electrode carrier that includes a housing structured for positioning to be in contact with a patient's cervico-vaginal tissue. The housing includes a main body having a toroid shape designed to fit around a patient's cervix and the main body has at least one surface configured for contacting the cervix. The housing may further include electrodes arranged on a surface of the main body to contact the patient's cervico-vaginal tissue. The electrodes may include sensing electrodes for measuring uterine electroactivity and modulating electrodes for applying an electrical modulation signal. The intravaginal electrode carrier may further include electrode leads housed within the main body and coupled to the respective electrodes, where the electrode leads are connectable to a uterine pacemaker.

In yet another embodiment, a method is disclosed for intravaginal control of uterine contractions. Electroactivity data of a patient's uterus is measured intravaginally via the cervico-vaginal tissue using sensing electrodes of an intravaginal electrode carrier having a housing structured for positioning to be in contact with the cervico-vaginal tissue. The electroactivity data may indicate a contraction of the uterus. The measured electroactivity data may be received and an electrical modulation signal may be generated based on the measured electroactivity data upon receiving the data. The generation of the electrical modulation signal may be timed according to the contraction. The electrical modulation signal may be transmitted to modulating electrodes of the intravaginal electrode carrier and applied intravaginally using the modulating electrodes to the uterus via the cervico-vaginal tissue.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 11 shows a first configuration where a connector is communicatively coupled with a uterine pacemaker that is outside of the body via a wired connection, according to at least one embodiment.

FIG. 12 shows a second configuration where a connector is communicatively coupled with a uterine pacemaker via a wireless connection, according to at least one embodiment.

FIG. 13 shows a third configuration where a connector is communicatively coupled to an external uterine contraction monitor via a wired connection and wirelessly coupled to a uterine pacemaker, according to at least one embodiment.

FIG. 16A shows a front view of a power adaptor assembly for a uterine pacemaker, according to at least one embodiment.

FIG. 16B shows a side view of the power adaptor assembly of FIG. 16A, according to at least one embodiment.

FIG. 16C shows a top view of the power adaptor assembly of FIG. 16A, according to at least one embodiment.

FIG. 17C shows a top view of the uterine pacemaker of FIG. 17A, according to at least one embodiment.

FIG. 17D shows a rear view of the uterine pacemaker of FIG. 17A, according to at least one embodiment.

FIG. 17E shows an isometric view of the uterine pacemaker of FIG. 17A, according to at least one embodiment.

FIG. 21 is a flowchart for illustrating a process for applying electrical modulation to the uterus to control contraction activity, according to at least one embodiment.

FIG. 24 shows an experimental finding of recorded EHG data and recorded EMG data during a time period with electrical modulation occurring before and after control times.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed. For example, the description below is focused on preterm labor, but this system can be used for other purposes, as well.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Intravaginal Muscle Controller System Architecture

Figure 1A:
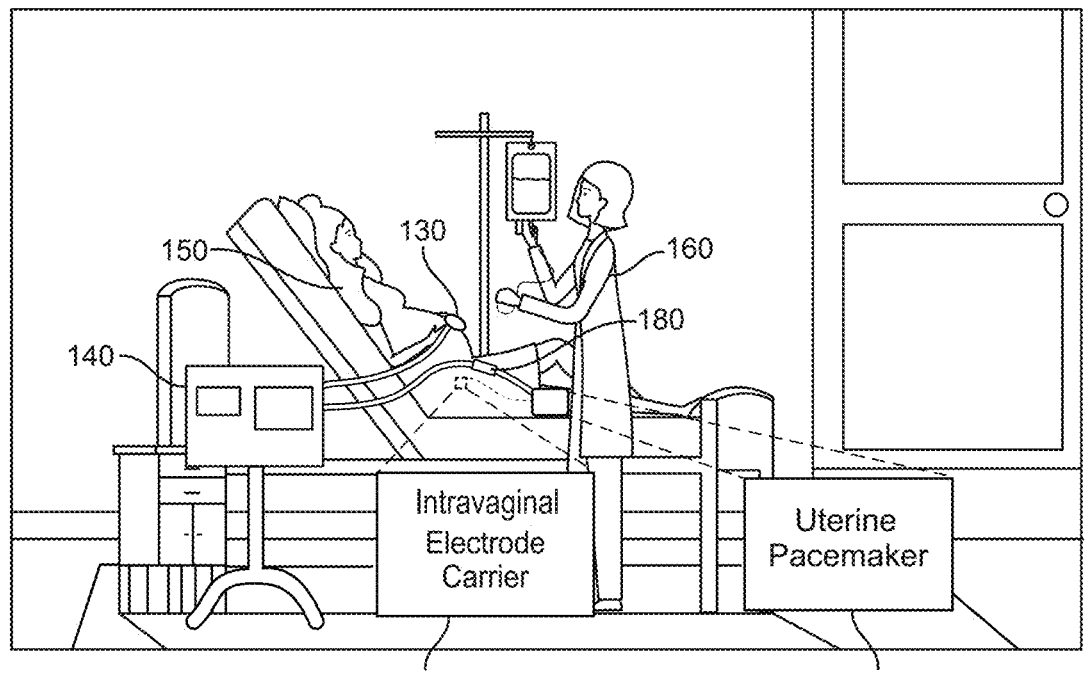
FIG. 1A depicts a system environment in which an intravaginal electrode carrier and external uterine pacemaker operate with an external uterine contraction monitor, according to at least one embodiment.

FIG. 1A depicts a system environment 100a in which an intravaginal electrode carrier 110 and external uterine pacemaker 120 operate with an external uterine contraction monitor 130, according to at least one embodiment. The system environment 100a includes the intravaginal electrode carrier 110, the uterine pacemaker 120, the external uterine contraction monitor 130, a medical personnel device 140, and a connector 180, and the individuals using the system in this embodiment are a patient 150 and a doctor 160 (or other medical personnel, such as a nurse, a nurse practitioner, a physician's assistant, etc.). The system environment 100a may have alternative configurations other than what is shown in FIG. 1A, including for example different, fewer, or additional components. For example, while not depicted, the patient 150 may have access to an override device that is coupled to the uterine pacemaker 120 such that the patient 150 may pause operation of the uterine pacemaker 120 (e.g., due to discomfort). An intravaginal muscle controller system as described herein may include at least an intravaginal electrode carrier and a uterine pacemaker. The intravaginal muscle controller system may also include additional components that interact with the intravaginal electrode carrier or the uterine pacemaker (e.g., an override device).

The intravaginal electrode carrier 110 measures uterine electroactivity and modulates uterine muscle activity with electrical modulation (e.g., an electrical modulating current) to control uterine contractions. The electrical modulation may also be referred to herein as an "electrical modulation signal" and may be used interchangeably. Electrodes of the intravaginal electrode carrier 110 may perform these functions. In particular, two or more sensing electrodes placed on the uterus (e.g., the surface of the cervico-vaginal tissue) may measure uterine electroactivity by determining the voltage between two of the sensing electrodes. In this manner, these electrodes can determine when a contraction is occurring or is about to occur. Furthermore, two or more modulating electrodes placed on the uterus may deliver electrical modulation to tissue between two of the modulating electrodes. These electrodes can deliver electrical current to the tissue according to the timing of the contraction sensed by the sensing electrodes to effectively inhibit or at least reduce the contraction. In some embodiments, there may be a single sensing electrode in the cervico-vaginal electrode carrier 110 rather than multiple sensing electrodes.

The intravaginal electrode carrier 110 may have a housing that takes one of various forms such as a catheter, a diaphragm, a pessary, any suitable shape for placement adjacent to the uterus and within the vagina, or any combination thereof. The intravaginal electrode carrier 110 may be structured for patient comfort or to stabilize the positioning of the device within the patient 150. For example, the intravaginal electrode carrier 110 may include balloons or custom housings to maintain a particular contact point for the sense or modulating electrodes at the cervico-vaginal tissue (e.g., cervical-lower uterine segment tissue). In some embodiments, the intravaginal electrode carrier 110 is coupled to the uterine pacemaker 120, which is outside of the patient's 150 body, via a wired connection. Example configurations of the intravaginal electrode carrier 110 are described further in the descriptions of FIGS. 4-8.

The uterine pacemaker 120 receives the measured uterine electroactivity data and generates electrical modulation to be applied to the patient's 150 uterus. In some embodiments, the uterine pacemaker 120 is coupled to one or both of the intravaginal electrode carrier 110 and the external uterine contraction monitor 130. For example, the uterine pacemaker 120 is depicted in FIG. 1A as being coupled to the external uterine contraction monitor 130 by way of the medical personnel device 140 and the connector 180. The measured uterine electroactivity data may be received from the intravaginal electrode carrier 110 or the external uterine contraction monitor 130. The connection to the external uterine contraction monitor 130 may be facilitated by the connector 180. For example, the external uterine contraction monitor 130 may provide measured uterine activity data to the medical personnel device 140 and the data may be communicated to the uterine pacemaker 120 via the connector 180. The uterine pacemaker 120 is outside of the patient's 150 body and is accessible by medical personnel such as the doctor 160. In particular, the doctor 160 may trigger electrical modulation to be generated by the uterine pacemaker 120 upon receiving a notification from the uterine pacemaker 120 that a contraction is has been detected. Thus, in this embodiment, the doctor 160 controls (e.g., by manipulating a physical button or switch, or selecting a control on a user interface of the pacemaker or a remote-control device, etc.) when electrical modulation is delivered to the patient's uterus to match the current delivery to the onset of a contraction as reported to the doctor by the pacemaker 120.

The uterine pacemaker 120 may determine whether a contraction is occurring based on the uterine muscle activity data received from either the intravaginal electrode carrier 110 or the external uterine contraction monitor 130. In some embodiments, the uterine pacemaker 120 may automatically determine when to trigger electrical modulation and provide the electrical modulation to the cervix, without the doctor 160 engaging with the uterine pacemaker 120 (e.g., pressing a button), in response to detecting a contraction. In this case, the timing of when to electrically stimulate the uterus is determined automatically, without input by the doctor or patient. The determined trigger may be referred to herein as a "triggering signal." The triggering signal may include instructions to generate electrical modulation. Example configurations of the uterine pacemaker 120 are described further in the descriptions of FIGS. 14-17.

The external uterine contraction monitor 130 measures the activity of the patient's 150 body to detect contractions from outside of the patient's 150 body. The external uterine contraction monitor 130 may include an electromyography, electrohysterogram, tocodynamometer, electro-magnetic magnetomyography, any suitable device for measuring a uterine contraction from the surface of the body, or a combination thereof. For example, the external uterine contraction monitor may be a device such as tocodynamometer that is placed over the patient's abdomen and measures strain or tension caused by movement of uterine muscles during a contraction. In some embodiments, the external uterine contraction monitor 130 transmits the measured data to the medical personnel device 140, which may further transmit the measured data to the uterine pacemaker 120 via the connector 180. The external uterine contraction monitor 130 may be used as a secondary method of sensing contractions in addition to the sensing by the electrodes of the intravaginal electrode carrier.

The connector 180 establishes a connection between the uterine pacemaker 120 and various configurations of medical personnel devices. The connector may also be referred to herein as an "adaptor" or "universal adaptor." One way by which the connector 180 establishes this connection is through one of various formats of input ports it is structured with to accommodate for the design of various brands of devices and data communication interfaces used by the brands. At least in this way, the connector 180 may be designed as a universal connector that allows it to connect to different models of devices 140 such that the uterine pacemaker 120 can readily communicate or transmit/receive data from many device models. The connector 180 may pass the data measured by the external uterine contraction monitor 130 and communicated by the medical personnel device 140 to the uterine pacemaker 120 (e.g., for determining a triggering signal or for storage). The connector 180 may be sized to be handheld. Although depicted as enabling a connection between the medical personnel device 140 and the uterine pacemaker 120, the connector may be configured to adapt the uterine pacemaker 120 to connect to various types of external uterine contraction monitors (e.g., the monitor 130).

In some embodiments, the connector 180 may include one or more processors configured to convert a signal representing uterine muscle activity (e.g., measured by the external uterine contraction monitor 130 and received directly or via the medical personnel device 140) to a trigger signal for the uterine pacemaker 120. For example, the tension measured by a tocodynamometer of external uterine contraction monitor 130 is received by the connector 180, which determines, based on the measured data, whether a triggering signal should be transmitted to the uterine pacemaker 120. In some embodiments, the connector 180 may be used to communicate data to the medical personnel device 140. For example, the uterine pacemaker 120 may output uterine activity data measured by the intravaginal electrode carrier 110 to the medical personnel device 140 via the connector 180. At least because the connector 180 includes various data communication ports (e.g., a USB port), the connector 180 is able to enable the uterine pacemaker 120 to output the measured data to a medical personnel device 140 and its data communication interface. The connector 180 is described further in the description of FIGS. 10-13.

The medical personnel device 140 may display data measured from the external uterine contraction monitor 130, the uterine pacemaker 120, or combination thereof. For example, the medical personnel device 140 may be fetal monitoring equipment or cardiotocograph that displays the fetal heart rate and the uterine electroactivity simultaneously. The medical personnel device 140 may receive the data for display either wirelessly or through a wired connection. The uterine pacemaker 110 or 210 may be configured to transmit the internally measured electroactivity data to the medical personnel device 140 for display. In some embodiments, the uterine pacemaker may use the connector 180 to facilitate this transmission of data to the medical personnel device 140.

The patient 150 is a pregnant woman. In some embodiments, the intravaginal electrode carrier 110 and the uterine pacemaker 120 may be used for pregnant non-human mammals in addition to humans, such as thoroughbred race horses, sheep, etc. The doctor 160 may be an obstetrician, neonatologist, any suitable medical personnel. The doctor 160 may use the uterine pacemaker 120 to inhibit or induce contractions of the patient 150 through a user input mechanism (e.g., buttons, dials, knobs, keyboard, touch screen display, etc.) on the uterine pacemaker 120. The doctor 160 may administer dosages of pharmacological agents to the patient 150 such as prostaglandins, antiprogestins, oxytocins, any suitable pharmacological stimuli for controlling contractions, or a combination thereof.

Figure 1B:
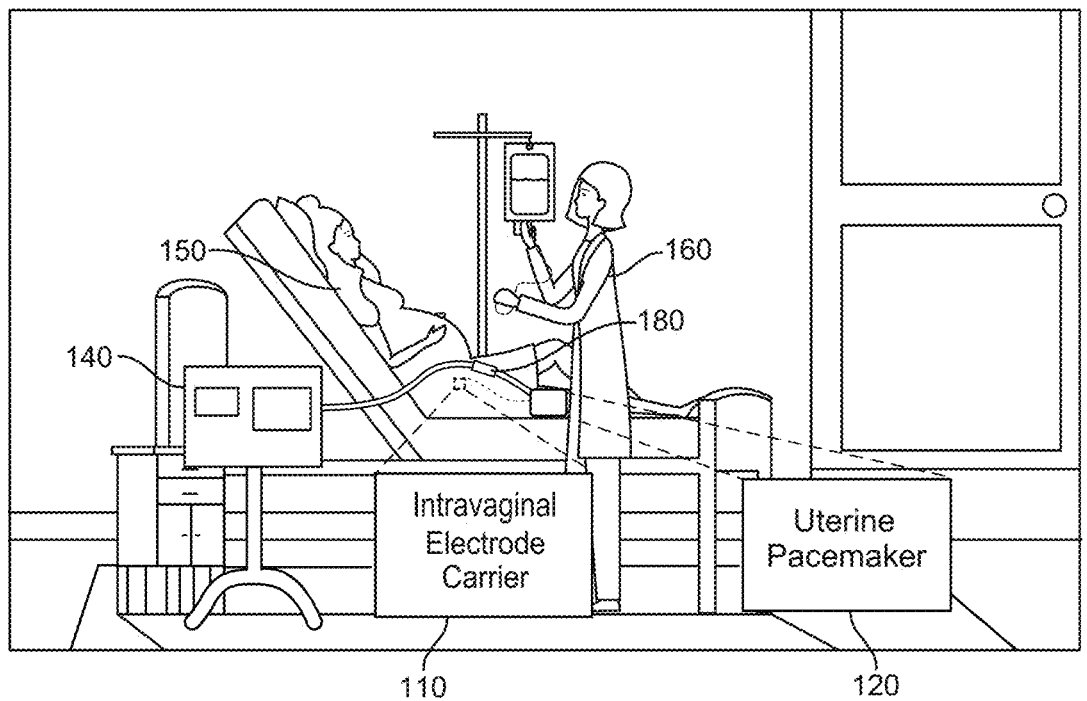
FIG. 1B depicts a system environment in which the intravaginal electrode carrier and external uterine pacemaker of FIG. 1A operate, according to at least one embodiment.

FIG. 1B depicts a system environment 100b in which the intravaginal electrode carrier 110 and the external uterine pacemaker 120 operate, according to at least one embodiment. The system environment 100b includes the intravaginal electrode carrier 110, the uterine pacemaker 120, the medical personnel device 140, the connector 180, and the individuals present are the patient 150 and the doctor 160 (or other medical personnel). In the system environment 100b, the intravaginal electrode carrier 110 provides measured uterine electroactivity data to the uterine pacemaker 120, which may provide the measured data to the medical personnel device 140 for display via the connector 180. The uterine pacemaker 120 may determine a triggering signal based on the data measured by the intravaginal electrode carrier 110 instead of data measured by an external uterine contraction monitor.

Figure 2A:
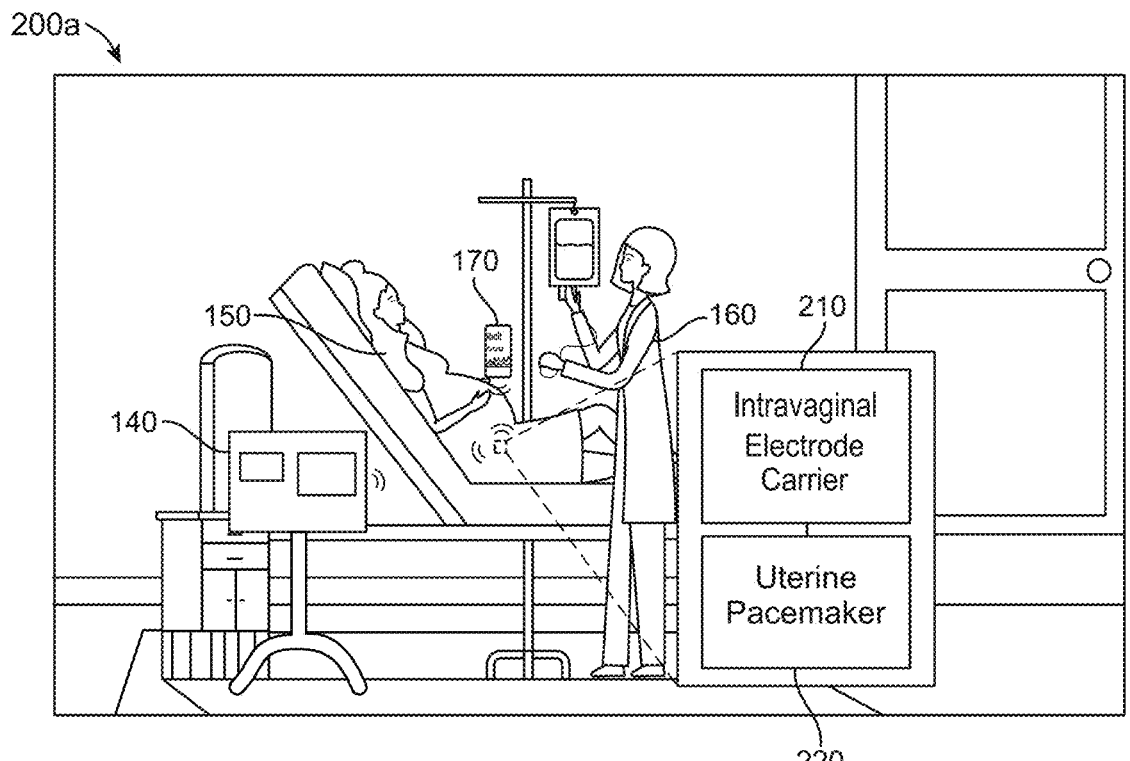
FIG. 2A depicts a system environment in which an intravaginal electrode carrier and intravaginal uterine pacemaker operate within the vagina of the patient, according to at least one embodiment.

FIG. 2A depicts a system environment 200a in which an intravaginal electrode carrier 210 and intravaginal uterine pacemaker 220 operate within the vagina of a patient 150, according to at least one embodiment. The system environment 200a includes the intravaginal electrode carrier 210, the uterine pacemaker 220, a medical personnel device 140, and a user device 170, and the individuals present are the patient 150 and the doctor 160 (or other medical personnel). The system environment 200a may have alternative configurations other than that shown in FIG. 2A, including for example different, fewer, or additional components. For example, the doctor 160 may be absent from the system environment 200a without affecting the operation of the intravaginal electrode carrier 210 and the uterine pacemaker 220 because they may automatically sense and modulate contractions without the presence of the doctor 160. Additionally, either or both of the medical personnel device 140 or the user device 170 may be absent from the system environment 200a without affecting the operation of the intravaginal electrode carrier 210 and the uterine pacemaker 220.

Although not depicted, a network may serve to communicatively couple the medical personnel device 140, the user device 170, and the uterine pacemaker 220, which may be communicatively coupled to the intravaginal electrode carrier 210 through a localized network (e.g., a wired connection). Devices described herein such as the uterine pacemaker 220 and the user device 170 may be configured to communicate via the network, which may comprise any combination of local area and/or wide area networks, using wired and/or wireless communication systems. For example, the wireless communication circuits referenced herein (e.g., wireless communication circuit 340 of the uterine pacemaker 220) enable the devices to communicate wirelessly over the network. In some embodiments, the network uses standard communications technologies and/or protocols. For example, the network includes communication links using technologies such as Ethernet, 802.11, worldwide interoperability for microwave access (WiMAX), 3G, 4G, 5G, code division multiple access (CDMA), digital subscriber line (DSL), millimeter wave (mmWave), Bluetooth, near-field communication, etc. Examples of networking protocols used for communicating via the network include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML) or extensible markup language (XML). In some embodiments, all or some of the communication links of the network may be encrypted using any suitable technique or techniques.

The intravaginal electrode carrier 210 and uterine pacemaker 220 may function similarly to the intravaginal electrode carrier 110 and uterine pacemaker 120, respectively. For example, the intravaginal electrode carrier 210 may also measure uterine electroactivity and modulate uterine muscle activity with electrical modulation to control uterine contractions. Likewise, the uterine pacemaker 220 may also detect uterine contractions and generate electrical modulation based on those detected uterine contractions. Additionally, the intravaginal electrode carrier 210 may have similar forms to the intravaginal electrode carrier 110 such as a catheter, a diaphragm, a pessary, any suitable shape for placement adjacent to the uterus and within the vagina, or any combination thereof. However, the form of the uterine pacemaker 220 may be smaller than the uterine pacemaker 120 to fit within the body. The uterine pacemaker 220 may also be configured to wirelessly communicate with external monitors and devices such as the user device 170 and the medical personnel device 140.

In some embodiments, the intravaginal electrode carrier 210 is coupled to the uterine pacemaker 220, which is inside of the patient's 150 body (e.g., the vagina). The intravaginal electrode carrier 210 and the uterine pacemaker 220 may be within a single device (e.g., within a single housing that is shared by the two components) or two devices at different locations within or near the uterus (e.g., adjacent to each other near or behind the cervix). For example, the uterine pacemaker 220 may be located on the intravaginal electrode carrier 210 (e.g., a pessary ring) that also includes sensing and modulating electrodes for applying the electrical modulation generated by the uterine pacemaker 220.

In another example, the uterine pacemaker 220 may be located within the patient's 150 vagina on a device separate from the intravaginal electrode carrier 210. The two devices may be coupled either via a wired connection or wirelessly. A wire may connect the electrodes of the intravaginal electrode carrier 210, positioned to contact the cervicovaginal tissue, to the uterine pacemaker 220, which may be located distally from the uterine pacemaker 220 within the body. Alternatively, the intravaginal electrode carrier 210 and uterine pacemaker 220 may be located at different positions within or near the uterus, and may communicate wirelessly. The uterine pacemaker 220 may receive data from the intravaginal electrode carrier 210, determine instructions for generating electrical modulation, and transmit the instructions to the intravaginal electrode carrier 210 for generation of the electrical modulation that is then applied via its modulating electrodes. Example configurations of the intravaginal electrode carrier 210 and the uterine pacemaker 220 are described further in the descriptions of FIGS. 3 and 11-13.

Figure 18:
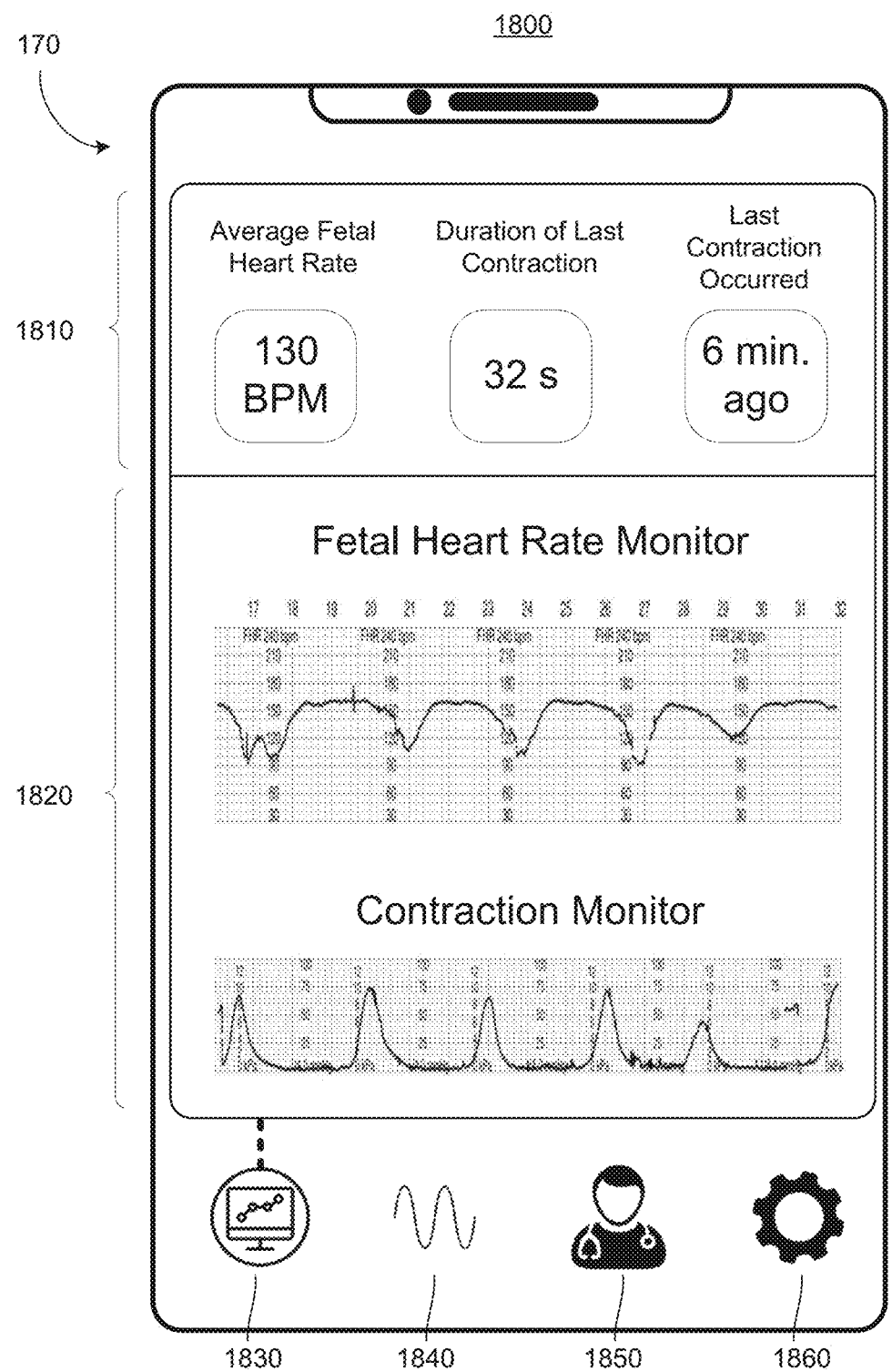
FIG. 18 depicts a user interface for monitoring contractions as displayed on the user device of FIGS. 2A and 2B, according to at least one embodiment.
Figure 19:
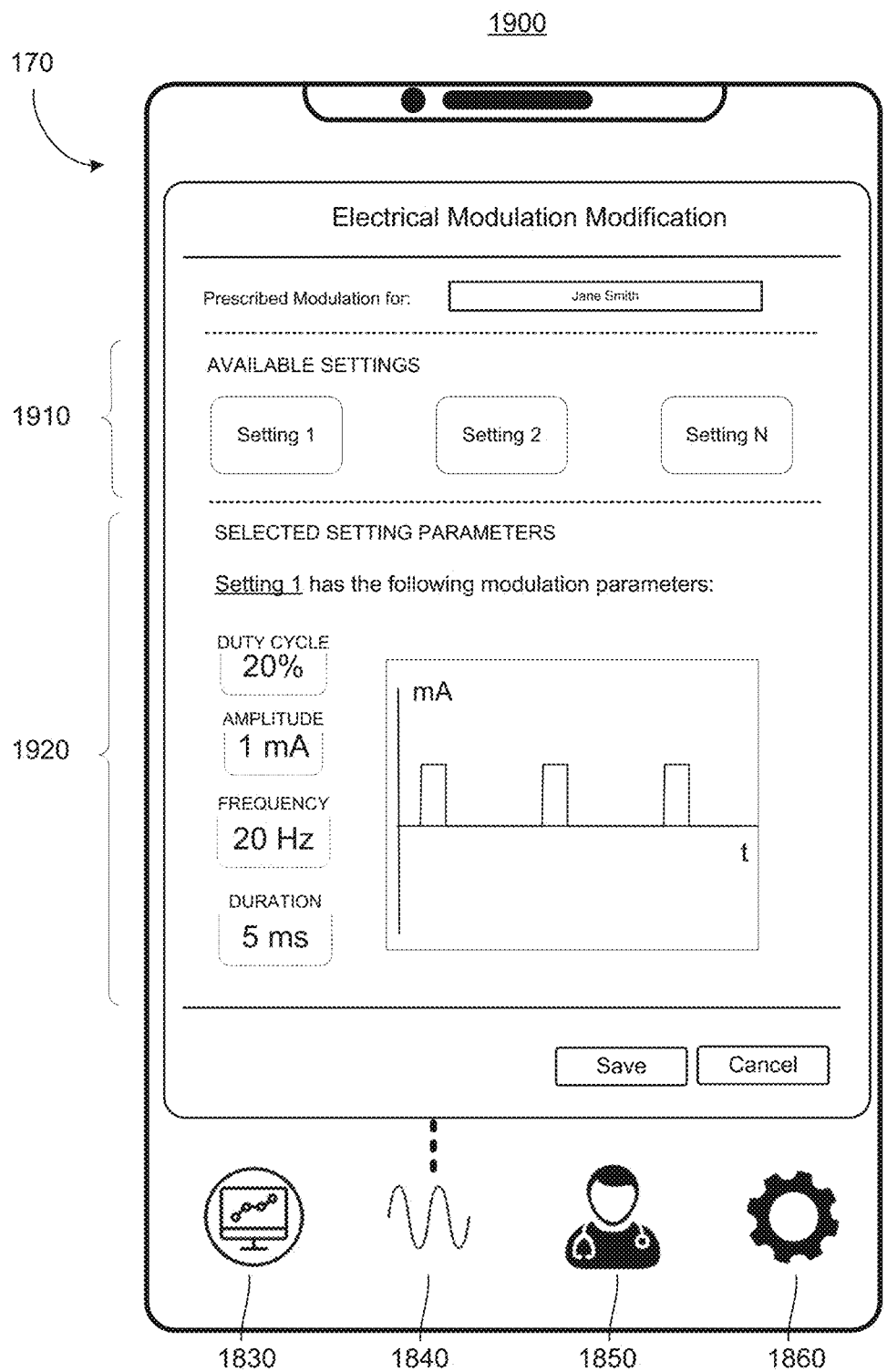
FIG. 19 depicts a user interface for controlling contractions as displayed on the user device of FIGS. 2A and 2B, according to at least one embodiment.

The user device 170 is a computing device capable of receiving user input as well as transmitting and/or receiving data via a network. In some embodiments, the user device 170 is a conventional computer system, such as a desktop or a laptop computer. Alternatively, the user device 170 may be a device having computer functionality, such as a personal digital assistant (PDA), a mobile telephone, a smartphone, or another suitable device. The user device 170 is configured to communicate with the uterine pacemaker 220 via a network, for example using a native application executed by the user device 170 or through an application programming interface (API) running on a native operating system of the user device 170, such as IOS® or ANDROID™. In another example, the user device 170 is configured to communicate with the uterine pacemaker 220 via an API running on the uterine pacemaker 220. In some embodiments, software applications that include monitoring and control interfaces as shown in FIGS. 18 and 19 are stored and/or executed on the user device 170.

The electrical modulation provided by the intravaginal electrode carriers 110 and 210 and the uterine pacemakers 120 and 220 may be used in conjunction with pharmacological agents (e.g., prostaglandins). The intravaginal electrode carriers 110 and 210 may be used to measure the effects of the pharmacological agents on uterine electroactivity. The sensing electrodes of the intravaginal electrode carrier may measure uterine muscle activity before and after the pharmacological agents are administered. The measured uterine muscle activity may be compared to determine to efficacy. For example, the amplitude of contractions detected within the EMG data measured by the intravaginal electrode carrier may be measured to determine the effect of the administered pharmacological agents.

Figure 2B:
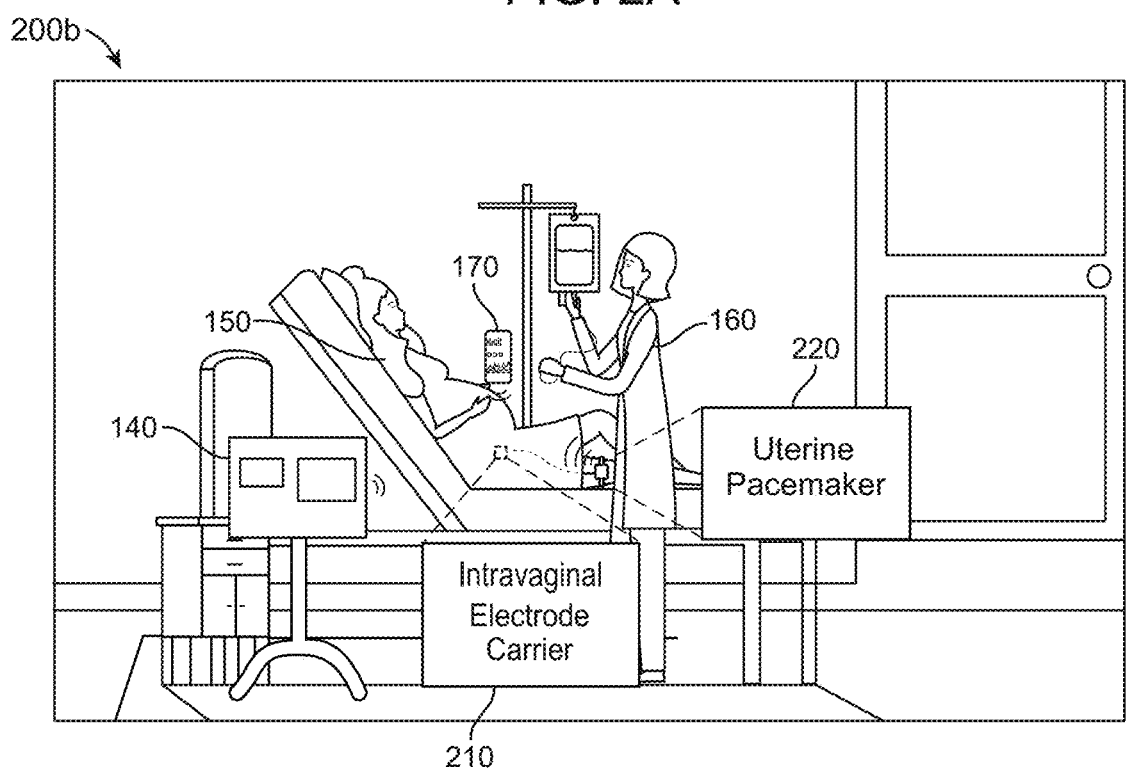
FIG. 2B depicts a system environment in which an intravaginal electrode carrier and a wearable uterine pacemaker operate, according to at least one embodiment.

FIG. 2B depicts a system environment 200b in which the intravaginal electrode carrier 210 and a wearable uterine pacemaker 220 operate, according to at least one embodiment. The system environment 200b includes the intravaginal electrode carrier 110, the uterine pacemaker 120, the medical personnel device 140, the connector 180, and the individuals present are the patient 150 and the doctor 160 (or other medical personnel). The system environment 200b may have alternative configurations other than that shown in FIG. 2B, including for example different, fewer, or additional components. Similar to the system environment 200a, the doctor 160, the medical personnel device 140, or the user device 170 may be absent from the system environment 200b without affecting the operation of the intravaginal electrode carrier 210 and the uterine pacemaker 220 because they may automatically sense and modulate contractions without the presence of the doctor 160, display of the measured data, or requiring user input or intervention. In the system environment 200b, the intravaginal electrode carrier 210 provides measured uterine electroactivity data to the uterine pacemaker 220, which may provide the measured data to the medical personnel device 140 or the user device 170 for display via a wireless network. The uterine pacemaker 220 may determine a triggering signal based on the data measured by the intravaginal electrode carrier 210. The uterine pacemaker 220 may function similar to the uterine pacemaker 120 and have a smaller form factor than the uterine pacemaker 120. The uterine pacemaker 220 may be wearable (e.g., including an adjustable strap to secure the uterine pacemaker 220 to the patient's 150 thigh). The uterine pacemaker 220 may be connected to the intravaginal electrode carrier 210 via a wired connection, depicted in the system environment 200b using dashed lines.

Figure 3:
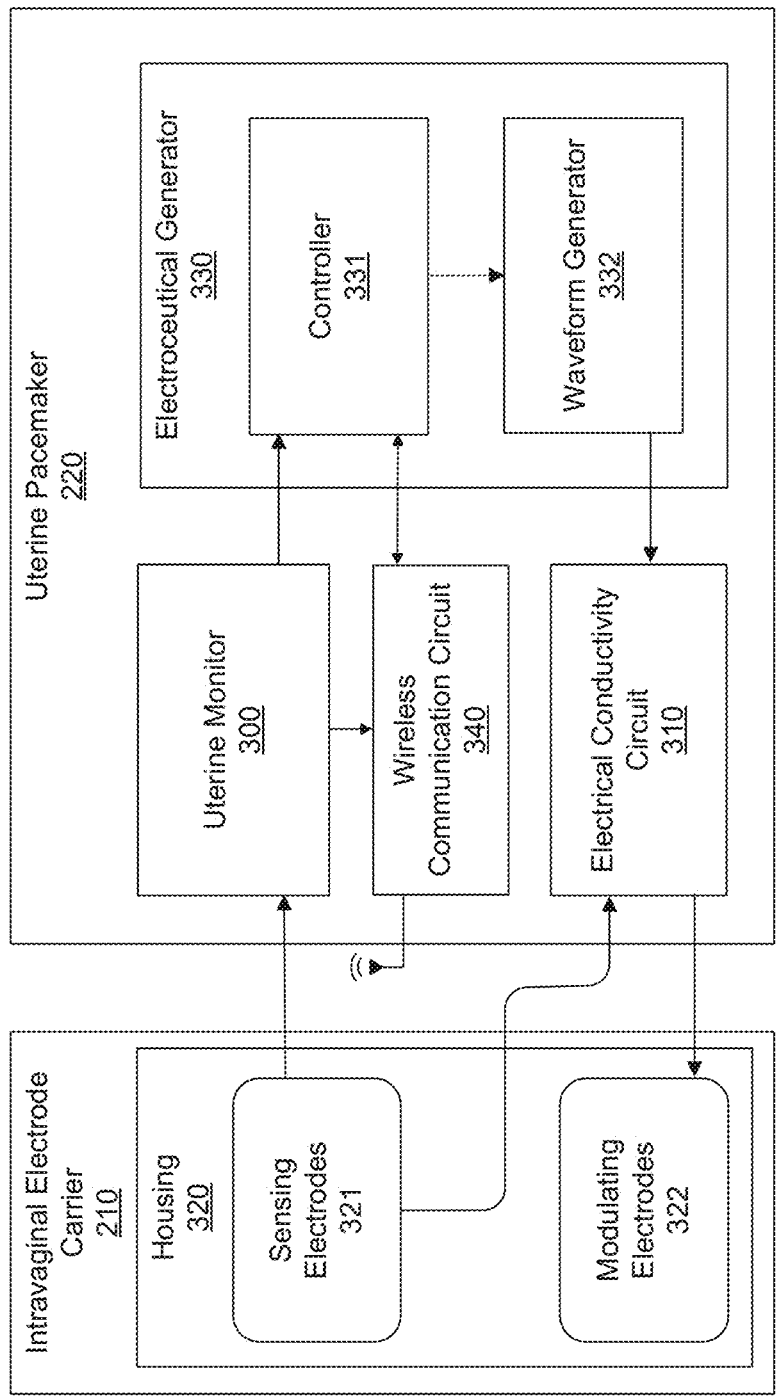
FIG. 3 is a block diagram of the intravaginal electrode carrier and the uterine pacemaker, according to at least one embodiment.

FIG. 3 is a block diagram of the intravaginal electrode carrier 210 and the uterine pacemaker 220, according to at least one embodiment. The intravaginal electrode carrier 210 includes a housing 320. The housing 320 includes sensing electrodes 321 and modulating electrodes 322. The intravaginal electrode carrier 210 is coupled to the uterine pacemaker 220, which includes a uterine monitor 300, an electrical conductivity circuit 310, electroceutical generator 330, and a wireless communication circuit 340. Both the intravaginal electrode carrier 210 and the uterine pacemaker 220 may have alternative configurations other than that shown in FIG. 3, including for example different, fewer, or additional components. For example, a connector similar to the connector 180 may be configured to wirelessly communicate with the uterine pacemaker 220 via the wireless communication circuit 340. The connector may transmit uterine activity data measured by an external uterine contraction monitor to the uterine pacemaker 220. Additionally, a rechargeable battery may be included in the uterine pacemaker 220 to enable the wireless placement within the body.

While references in FIG. 3 are made to the intravaginal electrode carrier 210 and the uterine pacemaker 220, the intravaginal electrode carrier 110 may have similar components and perform similar functions to the intravaginal electrode carrier 210 and the uterine pacemaker 120 may have similar components and perform similar functions to the uterine pacemaker 220.

The housing 320 of the intravaginal electrode carrier 210 encloses the electrodes 321 and 322 and helps to position and stabilize the intravaginal electrode carrier 210 within the body. In some embodiments, the housing 320 is a catheter, a diaphragm, a pessary, any suitable shape for placement adjacent to the uterus and within the vagina, or any combination thereof. The housing 320 may include a guide that has a shape similar to the shape of the uterus to position the intravaginal electrode carrier 210 to contact the appropriate tissues for monitoring and modulating contractions. The housing 320 may include a balloon to stabilize the positioning of the intravaginal electrode carrier 210 once positioned correctly. In some embodiments, the housing 320 also encloses electrical wiring (e.g., between the intravaginal electrode carrier 210 and the uterine pacemaker 220) or a tube for inflating the balloon. Various examples of housing are shown in FIGS. 4-10.

The sensing electrodes 321 measure uterine electroactivity from a surface of the uterus such as the cervico-vaginal tissue or uterine wall. The sensing electrodes 321 may provide the measured uterine electroactivity data to the uterine monitor 300. In some embodiments, the sensing electrodes 321 are used to measure the electrical conductivity of the uterus (e.g., the electrical conductivity of the tissue between the electrodes and the uterus epithelium). For example, the electrical conductivity circuit 310 may use an electrode pair of the sensing electrodes 321 to form a bridge circuit to determine the electrical conductivity of an area of the uterus. By determining the unknown electrical conductivity, the uterine pacemaker 220 may increase the efficiency at which it generates the electrical modulation. The modulating electrodes 322 apply the electrical modulation to the uterus through the cervix or lower uterine segment. In some embodiments, the electrodes 321 or 322 may penetrate a tissue in addition or in alternative to being applied superficially. For example, an electrode may be a needle or a screw that enters the tissue.

In some embodiments, each of the sensing electrodes 321 may be placed on a different tissue area such that the electroactivity or potential between two points can be measured. Likewise, each of the modulating electrodes 322 may be placed on different tissue areas to allow for electrical modulation to flow between a path on the body between two modulating electrodes. The placement of the sensing electrodes 321 may be based on the housing 320 of the intravaginal electrode carrier 210. For example, a catheter-type housing may cause the sensing electrodes 321 and the modulating electrodes 322 to be positioned in contact with the cervico-vaginal tissue of the patient's 150 uterus.

The uterine monitor 300 receives uterine electroactivity data measured by the sensing electrodes 321. This internally measured data may be the voltage between two sensing electrodes over time, which represents the electrical activity of the muscles of the uterus. The uterine monitor 300 may use the internally measured data to detect a contraction or verify the accuracy of the measured data. The uterine monitor 300 may send the data to a device outside of the body (e.g., for display by the user device 170) via the wireless communication circuit 340. Data communicated may include an indication that a contraction has been detected or the measured electroactivity data.

In some embodiments, the uterine monitor 300 verifies the accuracy of the data measured by the sensing electrodes 321. The uterine pacemaker 220 may use the externally measured data from the external uterine contraction monitor 130 to verify the accuracy of the internally measured data from the intravaginal electrode carrier 210. For example, the uterine monitor 300 may compare the number of contractions detected within data provided by the external uterine contraction monitor 130 and data provided by the intravaginal electrode carrier. Based on the comparison, the uterine monitor 300 may determine that a difference in detected contractions exceeds a predetermined threshold difference indicative of inaccurate measurement taken by the intravaginal electrode carrier. For example, the intravaginal electrode carrier may have shifted positions in the patient's body, decreasing the accuracy of the measurements taken. The uterine pacemaker 220 may generate a notification indicating that the measurements are inaccurate or that the intravaginal electrode carrier's operation should be modified (e.g., instructing the sensing electrodes be repositioned to generate accurate measurements). To receive the measured data from the external uterine contraction monitor 130 to verify the accuracy of the data, the uterine pacemaker 220 may use the wireless communication circuit 340 to receive the data. Similarly, the uterine pacemaker 120 may receive the measured data via a wired connection to the external uterine contraction monitor 130.

The uterine monitor 300 detects a contraction is occurring based on the value of the electroactivity data. In particular, the uterine monitor 300 may compare the electroactivity data values to a threshold voltage corresponding to a voltage exhibited by a contraction of the uterine muscles (e.g., fifty microvolts). In some embodiments, a threshold change in voltage may be used to detect a contraction. For example, an increase in electroactivity amplitude in volts by 150% may indicate a contraction has occurred. Additionally, a change in peak frequency of uterine muscle activity or in propagation velocity beyond a threshold frequency or velocity, respectively, may indicate that a contraction is occurring. The uterine monitor 300 may also provide the electroactivity data or the indication of the detected contraction to the electroceutical generator 330 to trigger the generation of electrical modulation.

The electroceutical generator 330 (or electrical modulator) generates the electrical modulation that is applied to the uterus via the modulation electrodes 322. The electroceutical generator 330 includes a controller 331 and a waveform generator 332. The electroceutical generator 330 may have alternative configurations than shown in FIG. 3, including for example different, fewer, or additional components. For example, the controller 331 may be omitted when there the electrical modulation applied to the uterus is a predetermined and fixed waveform that is either "on" (i.e., applied) or "off" (i.e., not applied) depending on whether a contraction is detected.

The controller 331 receives a triggering signal from at least one of the uterine monitor 300, a user device 170, a connector 180, or a user input mechanism of an external uterine pacemaker (e.g., the uterine pacemaker 120). The user device 170 and the connector 180 may transmit the triggering signal to the controller 331 via the wireless communication circuit 340. The triggering signal may serve as an instruction to generate electrical modulation that includes an indication that a contraction was detected and a characterization of the measured uterine muscle activity associated with the detected contraction. Based on this triggering signal, the controller 331 may determine when and how to apply electrical modulation using waveforms generated by the waveform generator 332.

The controller 331 may determine waveform parameters based on the measured electroactivity data. For example, the controller 331 may determine characteristics of uterine contractions detected based on the measured electroactivity data. Characteristics may include an amplitude, a frequency, an amount time between successive uterine contractions, propagation or conduction velocity, a change in amplitude between successive uterine contractions, or a combination thereof. The controller 331 may determine whether the characteristics indicate that an electrical modulation signal should be delivered to modulate (e.g., weaken) the uterine contractions. In one example, in response to determining that the electrical modulation signal should be delivered to weaken the uterine contractions, the controller 331 may determine a waveform parameter characterizing a duty cycle greater than 10%. In some embodiments, determining whether the electrical modulation signal should be delivered to weaken the uterine contractions includes determining whether amplitudes of the uterine contractions reaches or exceeds a threshold amplitude. In wherein determining whether to weaken the plurality of uterine contractions comprises determining whether a frequency of the plurality of uterine contractions exceeds a threshold frequency. The controller 331 may provide a summary of the determined waveform parameters used by the electroceutical generator 330 via the wireless communication circuit 340.

The controller 331 may determine when to activate and deactivate generated electrical modulation based on time needed to modulate the uterine muscle activity or intramural nerve fibers. For example, the controller 331 may implement a timer to determine when to deactivate electrical modulation. Examples of time needed to apply electrical modulation are described in the description of the waveform generator 332 with respect to various example waveforms that may be generated.

The waveform generator 332 generates a waveform of electrical modulation based on waveform parameters. The waveform generator 332 may be a constant current pulse generator. The waveform generator 332 may generate constant current pulses with reversable output polarity. Waveform parameters include waveform type, the number of phases of the waveform (e.g., monophasic, biphasic, etc.), frequency, interpulse interval (IPI), pulse width (PW), duty cycle, and amplitude. Waveform types include sine, square, triangle, and sawtooth waves. The waveforms may be monophasic, biphasic, or polyphasic. The biphasic waveforms may be symmetrical, balanced asymmetrical, or unbalanced asymmetrical. An additional, adjustable parameter of a biphasic waveform, as compared to the monophasic waveform, is the interphase delay.

The waveform parameters may be limited to a predetermined range of potential values. For example, the predetermined ranges may include 0-120 milliseconds (ms) for the pulse width of the waveform, 0-100 hertz (Hz) for the frequency, and 0-20 milliamperes (mA) for the amplitude. There may be a default set of waveform parameters that the waveform generator 332 uses to generate waveforms. In some embodiments, the waveform generator 332 receives waveform parameters determined by the controller 331 based on the measured electroactivity data. Descriptions of waveform parameters described herein may be approximate values, and may deviate from the stated example values within a threshold margin (e.g., ±10%).

In a first example of waveforms generated by the waveform generator 332, the waveforms may be used to control smooth muscle tissue with muscle cells having a chronaxie in the range of 0 to 100 ms. The waveforms may have a pulse width within 0.1 to 1 ms, a frequency of 2.5 to 60 Hz, and a constant current of 20 to 25 mA. The controller 331 may determine to activate the waveform for less than 1 second.

In a second example, the waveform generator 332 may generate waveforms with a pulse width of 0.5 to 0.7 ms, a frequency of 30 Hz, and a constant current of 10 to 20 mA. The controller 331 may determine to apply the waveform for 1 to 3 seconds.

In a third example, the waveform generator 332 may generate waveforms with a pulse width of 1 to 500 ms, a frequency of 0.05 to 50 Hz, and a current of 0.1 to 30 mA. The controller 331 may determine to apply the waveform for 0.5 to 10 seconds.

The electrical conductivity circuit 310 may include a network of circuit components (e.g., a bridge circuit and a variable resistor) configured to receive the waveform generated by the waveform generator 332's and output a modified version of the waveform via the modulation electrodes 322. This modified version of the waveform may account for the electrical conductivity of the area of the uterus to which the electrical modulation will be applied. For example, the electrical conductivity circuit 310 may minimize the reflection of the generated waveform from the uterus and maximize the power of the electrical modulation. In this way, the electrical conductivity circuit 310 enables the generated electrical modulation to be more efficiently delivered to control contractions.

Examples of Uterine Contraction Monitoring and Control Devices

Referring now to FIGS. 4 through 17, illustrated are examples of devices for monitoring and controlling uterine contractions such as the intravaginal electrode carrier and uterine pacemaker described herein. In particular, FIGS. 4 through 9 illustrate various forms of housing for at least the cervico-vaginal electrode carrier of the intravaginal electrode carrier system. While only one form of the housing is depicted as being used within the patient's vagina to deliver electrical modulation, any suitable combination of housings may be used within the vagina.

Figure 4A:
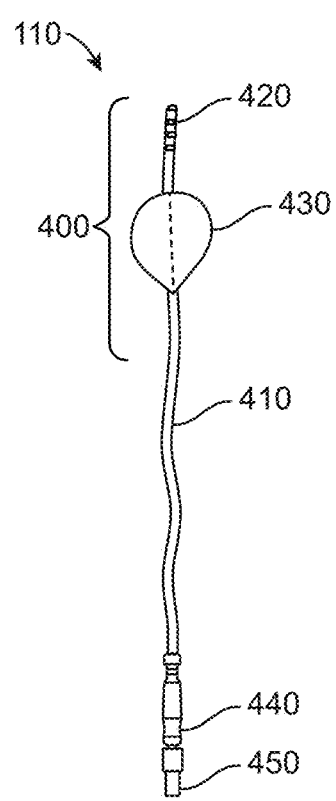
FIG. 4A is a front view of an intravaginal electrode carrier with a catheter housing, according to at least one embodiment.
Figure 4B:
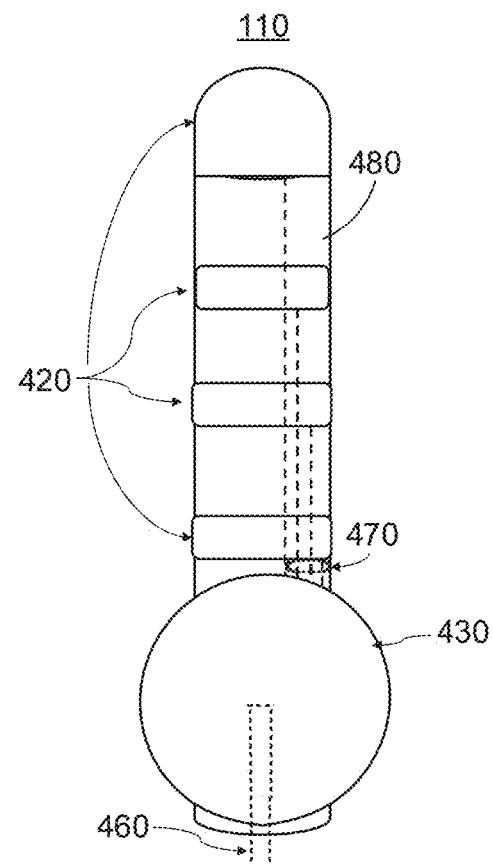
FIG. 4B is a view of a tip of the catheter housing of FIG. 4A, according to at least one embodiment.
Figure 5:
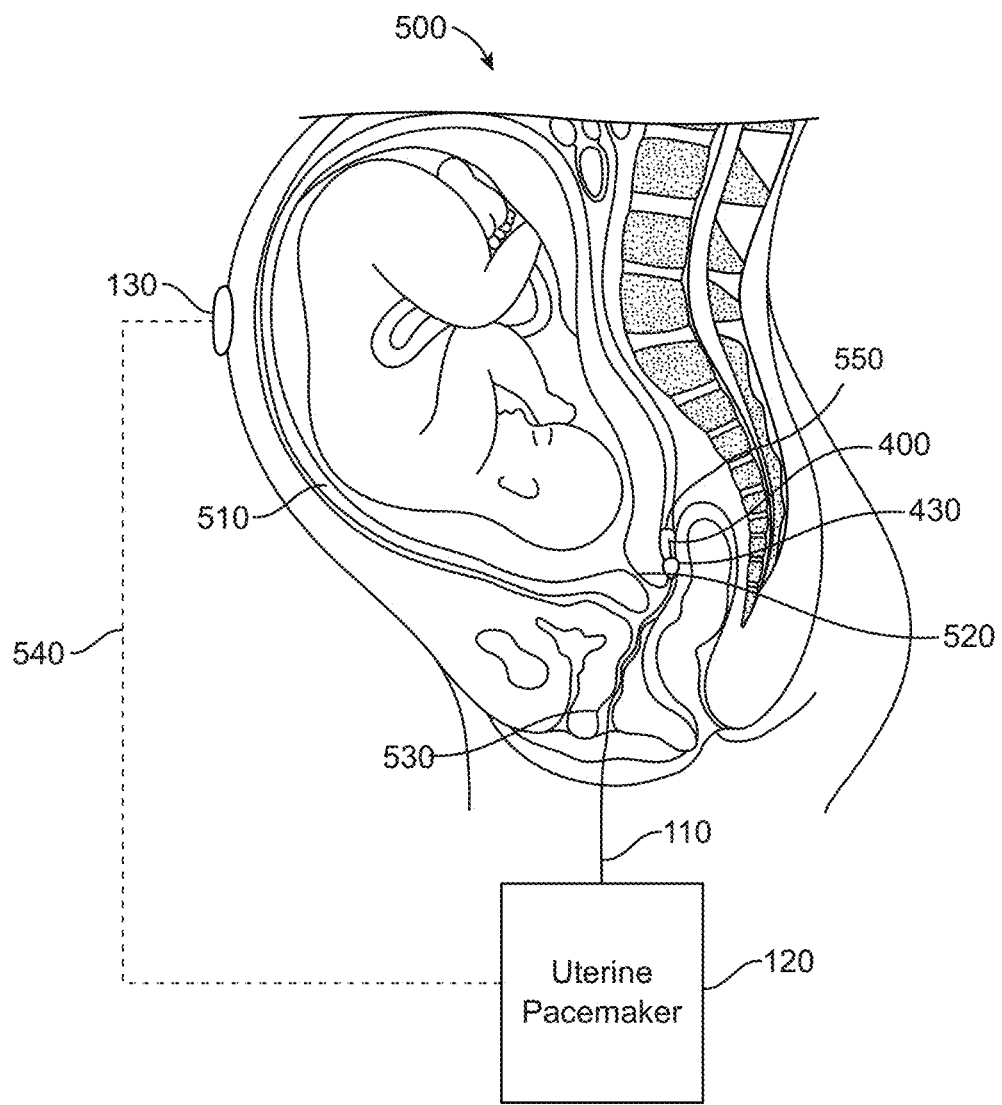
FIG. 5 shows a configuration of the intravaginal electrode carrier with the catheter housing of FIGS. 4A and 4B positioned within a body, according to at least one embodiment.

FIGS. 4 and 5 show an intravaginal electrode carrier 110 with a catheter housing 400, according to at least one embodiment. FIG. 4A is a front view of the intravaginal electrode carrier 110 with the catheter housing 400 and FIG. 4B is a view of a tip of the catheter housing 400. The intravaginal electrode carrier 110 includes the catheter housing 400, a tubing 410, ring electrodes 420, a balloon 430, an input port 440, an inflation channel 460, ring electrode leads 470, and a surface 480 over which the ring electrodes 420 are exposed. The intravaginal electrode carrier 110 may have alternative configurations other than those shown in FIGS. 4A and 4B, including for example different, fewer, or additional components. For example, the balloon 430, the input port 440, and the inflation channel 460 may be omitted in a wireless configuration of the intravaginal electrode carrier (e.g., intravaginal electrode carrier 210) where it is either collocated with or within the same device as a uterine pacemaker inside the body. Additionally, although a pacemaker connector 450 is depicted in FIG. 4A, the pacemaker connector 450 need not be included in the intravaginal electrode carrier 110. Rather, the pacemaker connector 450 may be a component of a uterine pacemaker.

The tubing 410 may be a plastic, hollow, and flexible tube that contains various wires and smaller tubes (e.g., for delivery electrical modulation and air for inflating the balloon). The tubing may be approximately 2 mm in diameter. The ring electrodes 420 include sensing electrodes and modulating electrodes. The ring electrodes 420 may be positioned near the distal end of the catheter housing 400 and over the surface 480. The surface 480 may be positioned to be in contact with the cervico-vaginal tissue of the patient 150. In some embodiments, the ring electrodes 420 may be placed in an alternating sequence with equidistant spacing between adjacent electrodes such that the area of tissue measured is similar to the area modulated. These evenly spaced electrodes may be employed in their entirety or selectively. That is, the uterine pacemaker coupled to the intravaginal electrode carrier 110 may select which electrodes to receive measured electroactivity from or which electrodes to apply electrical modulation through. In this way, the intravaginal electrode carrier 110 and the uterine pacemaker may target monitoring and electrical modulation to a particular location of the uterus. The electrodes can be arranged in a variety of different patterns, and positioned on the housing on one side in a line, or wrapping around the housing, or otherwise arranged to maximize contact with the tissue. The electrodes can also be placed at other locations on the device 110, including on the balloon or other parts of the catheter, or on a component that is shaped to fit behind the cervix in a way that allows the electrodes to contact the tissue.

Wiring within the tubing 410 may extend from the input port 440 to the ring electrodes 420. That is, the ring electrode leads 470 are wired from the input port 440 to each of their corresponding ring electrode. A portion of the ring electrode leads 470 are depicted as a set of four dashed lines in FIG. 4B. While only four ring electrodes are depicted in FIG. 4B, there may be any number of ring electrodes that may depend on the length of the cervix or the spacing between electrodes. For example, there may be a 5 mm inter-electrode distance (i.e., the distance between adjacent electrodes regardless of the type of electrode) and four electrodes used. Alternatively, eight electrodes may be located on the surface of the catheter housing 400 that are spaced with a 2.5 mm inter-electrode distance. The ring electrodes 420 may be composed of any suitable metal capable of withstanding corrosion associated with being placed in the body for a semi-permanent period of time (e.g., days or weeks). For example, the ring electrodes 420 may be composed of titanium, nickel-titanium alloys, cobalt-chrome alloys, platinum, silver, gold, or any suitable biocompatible metal. The ring electrode leads 470 may be composed of tinned or silvered copper, tinned or silvered tinsel, or carbon fiber.

The balloon 430 may be located on the intravaginal electrode carrier 110 towards the tip of the catheter housing 400 such that the balloon 430, when inflated, contacts a vaginal fornix to stabilize the positioning of the ring electrodes 420 in contact with cervico-vaginal tissue. During insertion of the intravaginal electrode carrier 110, the balloon 430 may be deflated to allow for unobstructed insertion. Once the intravaginal electrode carrier 110 is positioned (i.e., the ring electrodes 420 are contacting the cervicovaginal tissue), the balloon 430 may be inflated via the inflation channel 460 that may pass through the input port 440. Similarly, to remove the intravaginal electrode carrier 110, the balloon 430 may be deflated and the air released through the inflation channel 460. In other embodiments, the balloon may be filled with something other than air, such as a liquid or a gel. For example, a gel-filled balloon may be prefilled but compressible to fit into position near the cervix. The balloon may be differently shaped, including having a ring shape to fit around the cervix, or a partial ring shape to fit behind the cervix. It may also be designed to be inserted partially or fully into the posterior fornix. In some embodiments, instead of a balloon, another structure is present near the electrodes preventing the device from slipping out of the body, such as a plug design or disc-shaped design.

FIG. 5 shows a configuration 500 of the intravaginal electrode carrier 110 with the catheter housing 400, as described in FIGS. 4A and 4B, positioned within a body, according to at least one embodiment. The configuration 500 includes the intravaginal electrode carrier 110 with the catheter housing 400, the balloon 430, the uterine pacemaker 120, the external uterine contraction monitor 130, and a communication channel 540 (i.e., wired or wireless communication) between the external uterine contraction monitor and the uterine pacemaker 120. The intravaginal electrode carrier 110 is inserted into the vagina 530 and the tip of the catheter housing 400 is positioned at a vaginal fornix (e.g., the posterior fornix 550) such that it contacts the tissue of the cervix 520. While an external monitor is shown in FIG. 5, in some embodiments there is no external monitor and all of the sensing of contractions occurs intravaginally.

Once the intravaginal electrode carrier 110 is positioned, the balloon 430 may be inflated to secure the position as the patient moves. The positioned intravaginal electrode carrier 110 may then measure the uterine electroactivity of the uterus 510 and transmit the measured uterine electroactivity data to determine if and how electrical modulation should be applied. The uterine pacemaker 120 determines electrical modulation should be applied in response to detecting a contraction within the measured uterine electroactivity data and may generate a particular waveform for modulation based on the characteristics of the contractions detected. The uterine pacemaker 120 then outputs the electrical modulation to the intravaginal electrode carrier 110 via the wired connection through the vagina 530 to be applied at the tissue of the cervix 520.

Figure 6A:
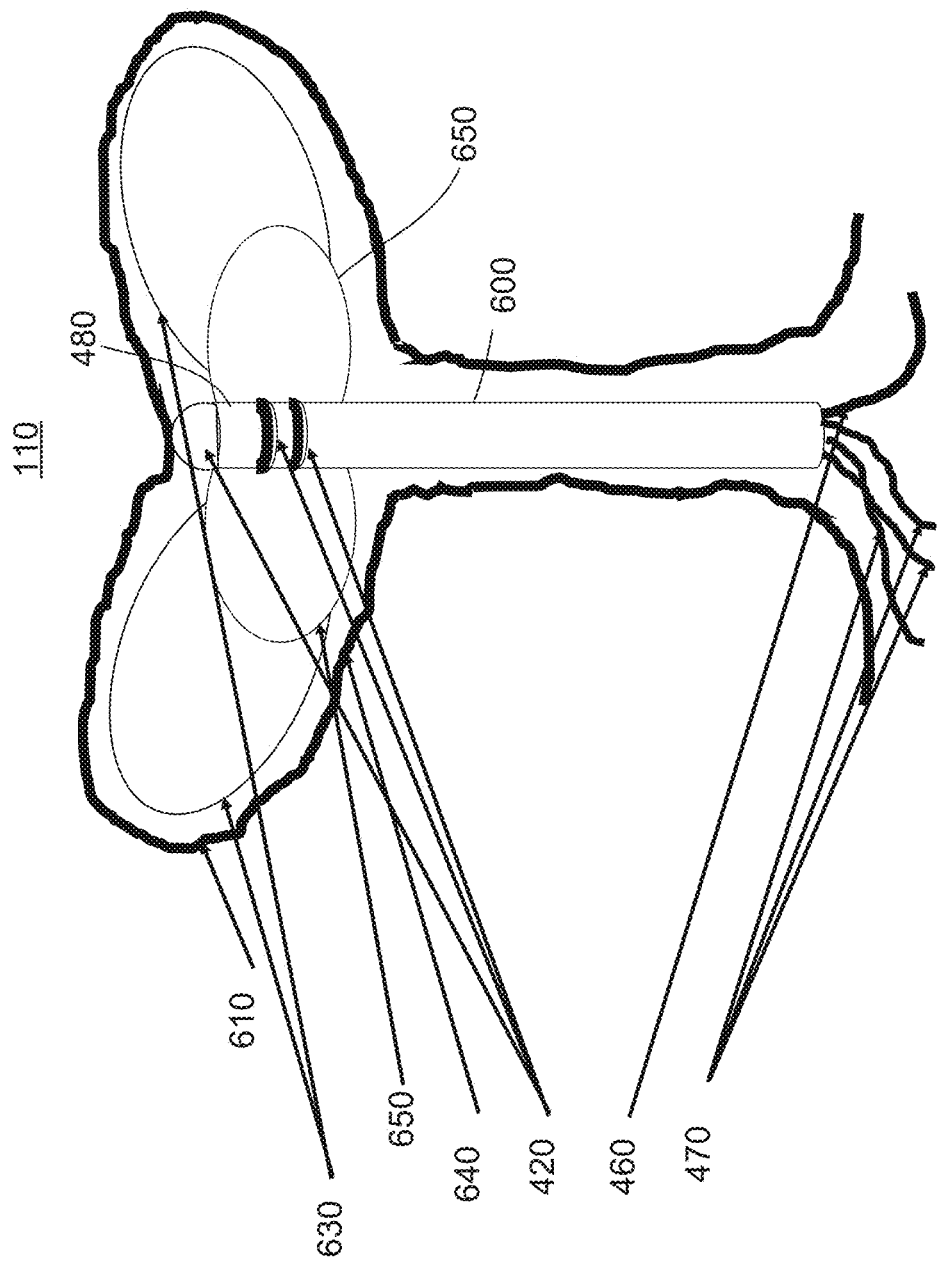
FIG. 6A-C show an intravaginal electrode carrier system with a butterfly housing, according to at least one embodiment.
Figure 6C:
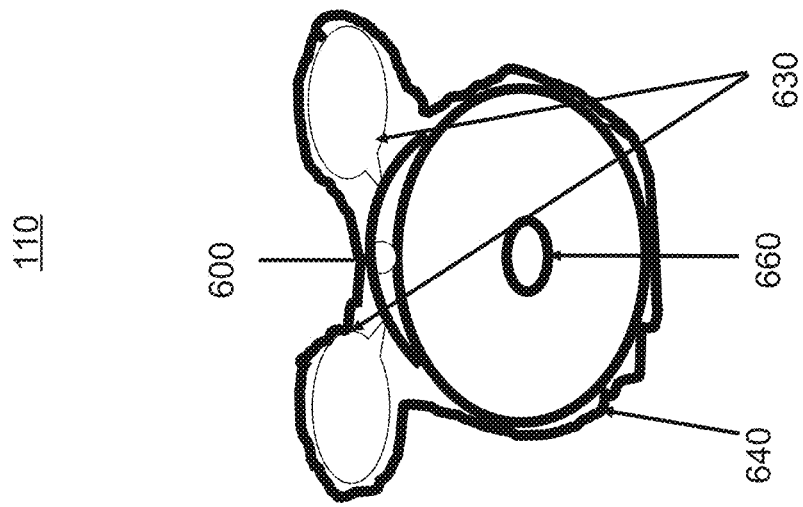
Figure 6B:
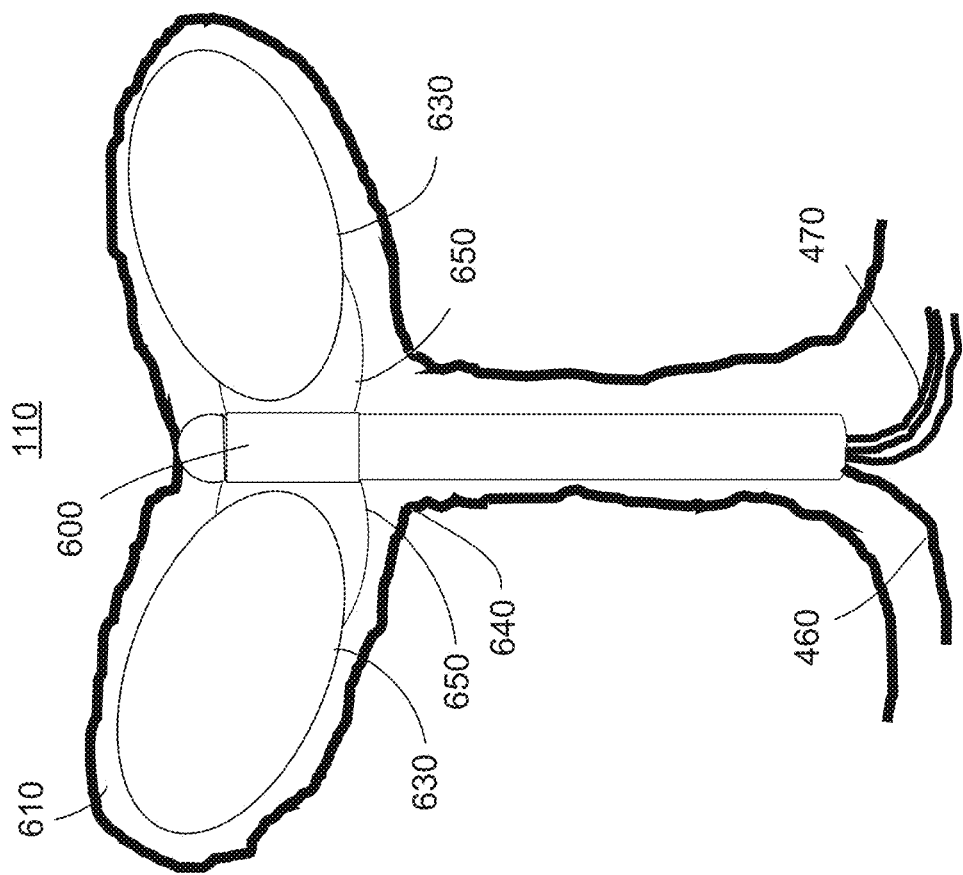

FIGS. 6A-C show the intravaginal electrode carrier 110 with a butterfly housing 600, according to at least one embodiment. FIG. 6A shows a front view of the butterfly housing 600, FIG. 6B shows rear view of the butterfly housing 600, and FIG. 6C shows a top view of the butterfly housing 600. A portion of the butterfly housing 600 may be shaped similar to the catheter housing 400 of FIGS. 4A, 4B, and 5. A primary feature of the butterfly housing 600 may be the butterfly balloon platform 650 and the butterfly balloons 630 that reflect the butterfly shape of the housing. The intravaginal electrode carrier 110 may have alternative configurations than shown in FIGS. 6A-C, including for example different, fewer, or additional components. For example, the input port 440 may be included in the butterfly housing 640 to couple the intravaginal electrode carrier 110 to a uterine pacemaker via the pacemaker connector 450. In some embodiments, the input port 440 and the pacemaker connector 450 are common components across various housing types such that they enable one type of housing for the intravaginal electrode carrier to be swapped with another.

The butterfly housing 600 includes an elongated main body similar to the catheter housing 400 that is constructed to be inserted through the vagina. Like the catheter housing 400, the butterfly housing 600 includes the ring electrodes 420, the ring electrode leads 470, the inflation channel 460, and the surface 480 over which the ring electrodes 420 are exposed. The butterfly housing 600 may be plastic and flexible. The butterfly housing 600 may use the butterfly balloon platforms 650 and the butterfly balloons 630 to stabilize the intravaginal electrode carrier 110 after it is positioned within the body. The butterfly balloon platforms may extend 50-70 mm from the tip of one platform to another (i.e., the wingspan of the butterfly housing 600).

The butterfly housing 600 is structured to be placed behind the cervix and its canal 660, as shown in FIG. 6C, such that the ring electrodes 420 contact the cervico-vaginal tissue. Deflated butterfly balloons may be coupled to the butterfly balloon platforms 650 prior to insertion. After insertion, they may be inflated in a similar position to the butterfly balloon platforms 650. The butterfly balloon platforms 650 may be positioned near the tip (i.e., the distal end) of the butterfly housing 600 and the butterfly balloon platforms 650 may span away distally such that the butterfly housing 600 resembles the shape of the vaginal fornixes 610. Due to this shape, the butterfly balloons 630 that are coupled to the butterfly platforms 650 may inflate to contact the vaginal fornixes 610. The butterfly balloons 630 may be inflated using the inflation channel 460. The inflated butterfly balloons 630 may press and secure the position of electrodes on the anterior surface of the butterfly housing 600 that contact the cervico-vaginal tissue. The alternative designs of the balloon 430 that were described above also apply to the butterfly balloons 630, including the various different shapes and configurations.

The butterfly housing 600 may be positioned to be in contact with cervico-vaginal tissue of the patient 160. For example, the surface 480 and the ring electrodes 420 may contact the cervico-vaginal tissue. The butterfly housing 600 may include a main body that has a cylindrical shape (e.g., a shape similar to that of the catheter housing 400), the balloon platforms 650 attached to and protruding outward from the main body, inflation channel openings on the main body, and the butterfly balloons 630. The inflation channel openings may be positioned at each of the balloon platforms. The butterfly balloons 630 may be associated with the main body, with one of the balloons coupled to each of the inflation channel openings. The inflation channel 460 may multiple inflation channels housed within the butterfly housing 600, where each of the inflation channels includes a hollow tube and is coupled to a respective inflation channel opening.

In some embodiments, the electrodes 420 exposed over the surface 480 of the butterfly housing 600 have different shapes in addition or as an alternative to ring electrodes (e.g., a strip, a half moon, round, polyhedron, etc.). The electrodes may be located on one side of the main body of the butterfly housing 600. In some embodiments, the intravaginal electrode carrier 110 includes an input port located at a proximal end of the intravaginal electrode carrier 110. The input port may be configured to connect to a uterine pacemaker (e.g., the uterine pacemaker 120). The electrode leads 470 or the inflation channels, may be coupled to the input port. The butterfly balloons 630 may be inflated using water, air, gel, or any other suitable sterile inflation means. In some embodiments, the inflation channel openings are located at rear sides of the butterfly balloon platforms 650. The butterfly balloon platforms 650 may have a flat disc shape or be flexible.

Figure 7A:
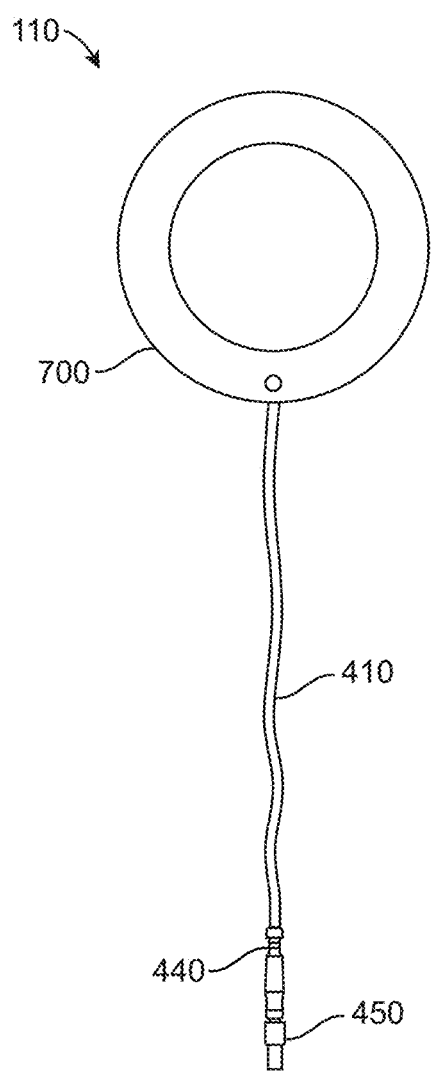
FIG. 7A is a rear view of an intravaginal electrode carrier with a pessary ring housing, according to at least one embodiment.
Figure 7B:
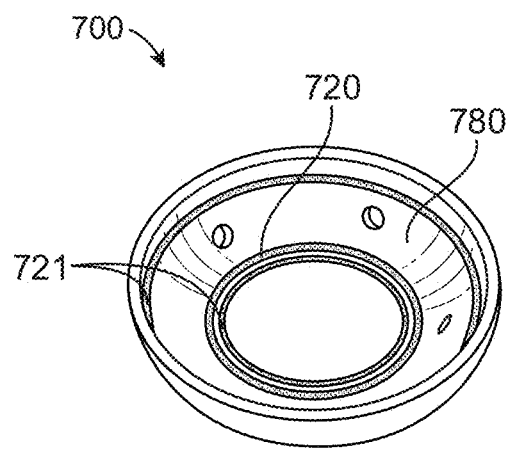
FIG. 7B is a bottom isometric view of the pessary ring housing of FIG. 7A, according to at least one embodiment.
Figure 7C:
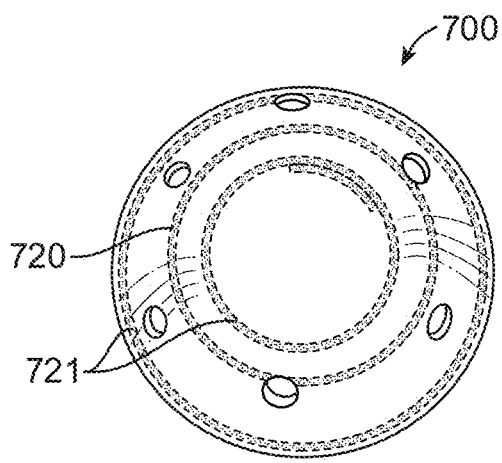
FIG. 7C is a top isometric view of the pessary ring housing of FIG. 7A, according to at least one embodiment.

FIGS. 7A, 7B, 7C, and 8 show an intravaginal electrode carrier 110 with a pessary ring housing 700, according to at least one embodiment. FIG. 7A is a rear view of the intravaginal electrode carrier 110 with the pessary ring housing 700, FIG. 7B is a bottom isometric view of the pessary ring housing 700, and FIG. 7C is a top isometric view of the pessary ring housing 700. The intravaginal electrode carrier 110 includes the pessary ring housing 700, the tubing 410, the input port 440, sensing electrodes 720, and modulating electrodes 721. The intravaginal electrode carrier 110 may have alternative configurations other than those shown in FIGS. 7A, 7B, and 7C, including for example different, fewer, or additional components. For example, the intravaginal electrode carrier 110 may also include a dispenser. For example, the dispenser may be a local anesthetic dispenser that is configured to release an anesthetic to the cervix area for increased comfort. The dispenser may be a conductive gel dispenser that is configured to release a gel that increases the conductivity at one or more of the sensing and modulating electrodes. Additionally, although a pacemaker connector 450 is depicted in FIG. 7A, the pacemaker connector 450 need not be included in the intravaginal electrode carrier 110. Rather, the pacemaker connector 450 may be a component of a uterine pacemaker.

The pessary ring housing 700 may be made of silicone or latex and hollow to contain the leads for the sensing electrodes 720 and the modulating electrodes 721. While the pessary ring housing 700 is described with the term "pessary," any suitable pessary-like form may be used (e.g., a toroid shape or a barrel shape). The internal diameter of the pessary ring housing 700 may be within the range of 32-35 mm. Similar to FIGS. 4A and 4B, the intravaginal electrode carrier 110 may include the tubing 410 and the input port 440 to couple itself to a uterine pacemaker having the pacemaker connector 450. Electrode leads for the sensing electrodes 720 and the modulating electrodes 721 may extend from the input port 440 to a surface of the pessary ring housing 700. For example, as shown in FIG. 7B, the electrode leads may terminate at the exposed electrodes on the front of the pessary ring housing 700.

FIGS. 7B and 7C depict a detailed view of the electrodes 720 and 721 on the surface 780 which contacts the cervico-vaginal tissue. The surface 780 is the inner surface of the pessary ring housing 700. The surface 780 may be concave to form to the shape of the cervix. FIG. 7C shows a bottom view of the pessary housing 700 with the electrodes 720 and 721 drawn using dashed lines to indicate their exposure only to the surface 780 (i.e., the inner surface of the pessary ring housing 700). The electrodes 720 and 721 are depicted as being ring electrodes but may be placed on the surface 780 in any suitable shape (e.g., a strip, round, square, polyhedron, etc.) or combination of shapes. The sensing electrodes 720 and modulating electrodes 721 may be placed in an alternating sequence around the pessary ring housing 700. For example, the modulating electrodes 721 are placed with a sensing electrode 720 in between them. Although only three electrodes are shown, the surface 780 may include any suitable number of electrodes. The electrodes 720 and 721 may run concentric to the toroid shape of the pessary ring housing 700. In some embodiments, the electrodes 720 and 721 may be placed on a limited area of the pessary ring housing 700 (e.g., forming a semicircle) to target electrical modulation to a particular location of the uterus. In some embodiments, the electrodes 720 and 721 are spaced equidistant from adjacent electrodes. The electrodes may be employed in their entirety or selectively. That is, the uterine pacemaker coupled to the intravaginal electrode carrier 110 may select which electrodes to receive measured electroactivity from or which electrodes to apply electrical modulation through. This may be another way to target monitoring and electrical modulation to a particular location of the uterus.

The pessary ring housing 700 may include a main body that has a toroid shape designed to fit around the cervix of the patient 150. The main body may have at least one surface (e.g., the surface 780) configured for contacting the cervix. The pessary ring housing 700 may include the electrodes 720 and 721 arranged on the surface 780 of the main body to contact the cervico-vaginal tissue. The pessary ring housing 700 may house electrode leads within the main body. Each of the electrode leads may be coupled to one of the electrodes 720 and 721 at one end of the lead and connectable to a uterine pacemaker at the other end (e.g., via the input port 440 and the pacemaker connector 450). The intravaginal electrode carrier 110 may also include a strap (e.g., a cable tie) that is structured to fasten around the cervix of the patient 150. The electrodes 720 and 721 may be located around the toroid shape of the main body. The electrodes 720 and 721 are depicted as having a circular shape, but may take various shapes such as strips, half-moons, rings around the main body, etc. The intravaginal electrode carrier 110 may include a dispenser configured to release an anesthetic or a conductive gel to the surface of the patient's 150 uterus. The dispenser may be associated with a dispenser opening on the main body of the pessary ring housing 700. The electrodes 720 and 721 may be arranged on the surface 780, where the surface 780 faces the center of the toroid shape of the main body and wraps around and contact the cervix. Although the input port 440 is depicted as being located at one end of the tubing 410, the input port 440 may be located on the main body.

Figure 8:
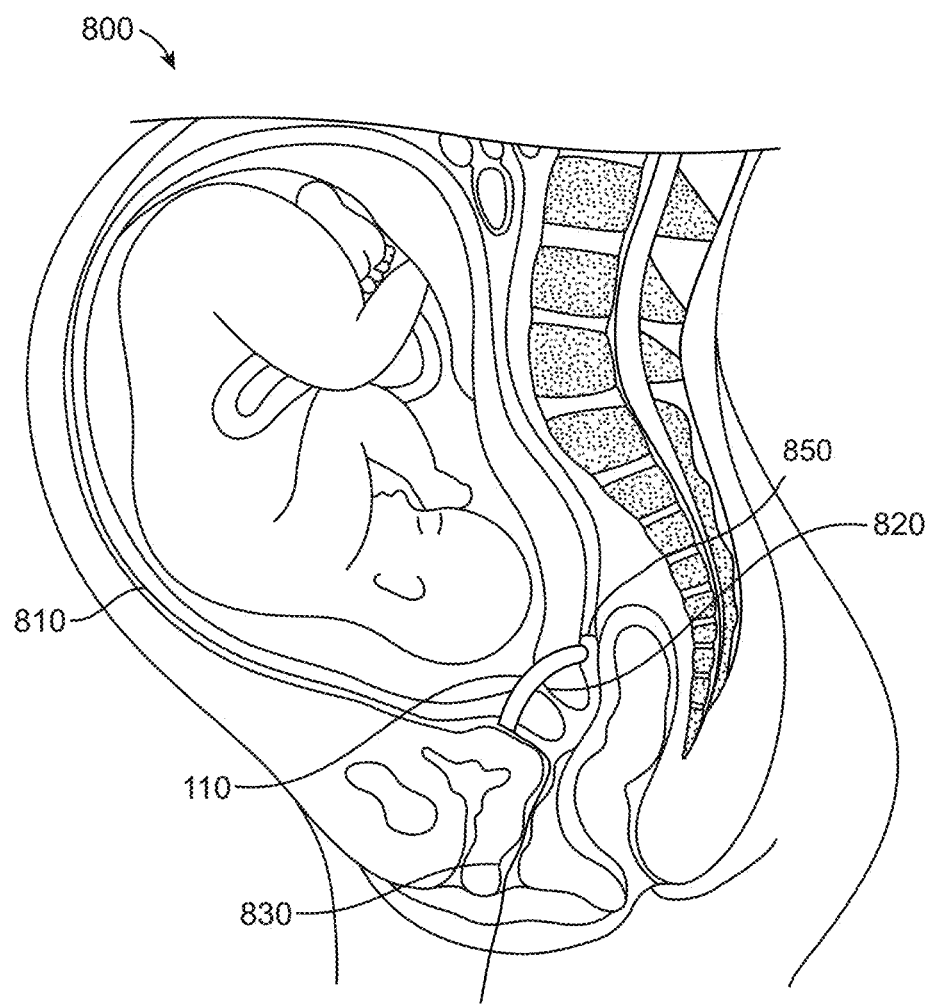
FIG. 8 depicts a configuration of the intravaginal electrode carrier with the pessary ring housing of FIGS. 7A and 7B positioned within a body, according to at least one embodiment.

FIG. 8 depicts a configuration 800 of the intravaginal electrode carrier 110 with the pessary ring housing 700 within the body. The intravaginal electrode carrier 110 is inserted through the vagina 830 and positioned underneath the cervix 820 and in the posterior fornix 850. In particular, the bottom of pessary ring housing 700, as shown in FIG. 7B, may be placed against the cervico-vaginal tissue such that the sensing electrodes 720 and modulating electrodes 721 are in contact with the cervico-vaginal tissue for monitoring and controlling contractions of the uterus 810. Although FIGS. 7A and 8, are depicted with a wired connection to an external uterine pacemaker, the intravaginal electrode carrier 110 may be a wireless device that is collocated with the uterine pacemaker or integrated with the uterine pacemaker within the body. This wireless configuration may omit the tubing 410, the input port 440, and the pacemaker connector 450, but include wireless communications circuitry.

Figure 9A:
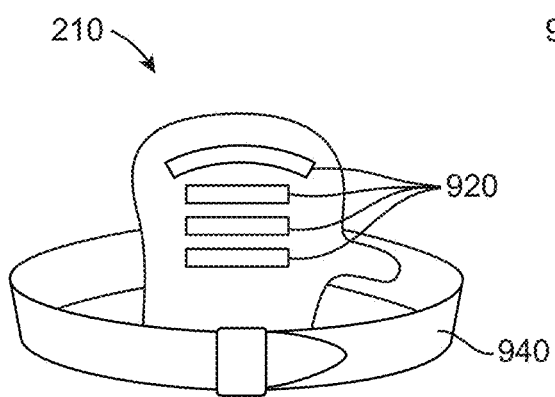
FIG. 9A shows a front view of an intravaginal electrode carrier that is facing the posterior of the body, according to at least one embodiment.
Figure 9B:
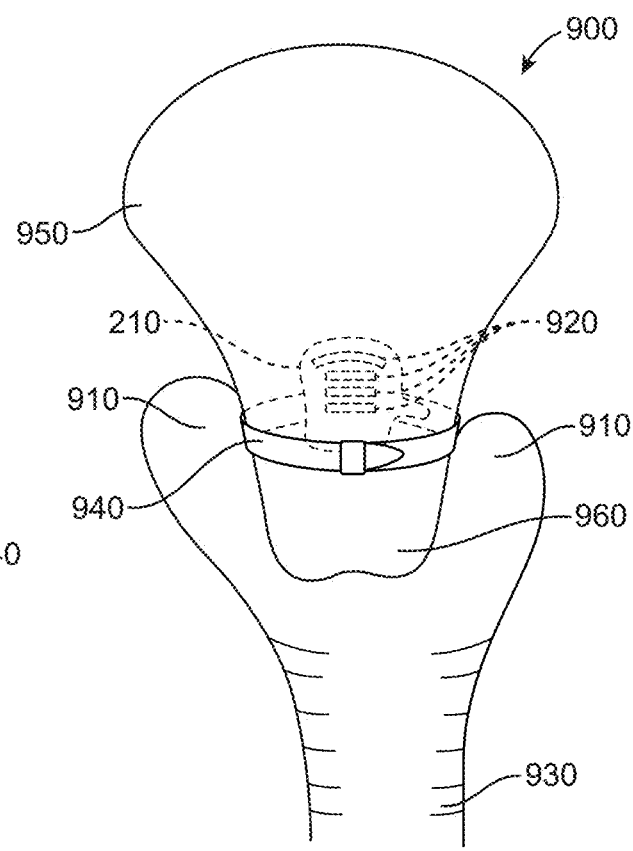
FIG. 9B shows a rear view of the intravaginal electrode carrier of FIG. 9A that is facing the anterior of the body, according to at least one embodiment.

FIGS. 9A and 9B show a configuration 900 of an intravaginal muscle controller system with an intravaginal electrode carrier 210 with a strap support 940, according to at least one embodiment. FIG. 9A shows a rear view of the intravaginal electrode carrier 210. FIG. 9B shows the rear view of the intravaginal electrode carrier 210 that is placed around the cervix. The intravaginal electrode carrier 210 may include strap support 940 and a housing for the intravaginal electrode carrier that includes sensing and modulating electrodes 920 exposed on a cervix-facing surface (i.e., inner surface) of the housing. The uterine pacemaker 220 for generating electrical modulation may be integrated with the intravaginal electrode carrier 210 to form the intravaginal muscle controller system located within the vagina. The intravaginal electrode carrier 210 may have alternative configurations than shown in FIGS. 9A and 9B, including for example different, fewer, or additional components. For example, the intravaginal electrode carrier 210 may have more than four electrodes of the sensing and modulating electrodes 920 depicted in FIG. 9A. The strap support may also be referred to as a "strap" as described herein.

In some embodiments, the strap support 940 is a cable tie and made of an expandable and flexible plastic capable of fastening without applying a pressure on the cervix that would disturb proper flow of blood through the cervicovaginal tissue or cause discomfort to the patient 150. The intravaginal electrode carrier 210 may include two cervix-facing loops through which the strap support 940 is loosely passed. The intravaginal electrode carrier 210 with the strap support 940 may include a wireless version of the uterine pacemaker (e.g., the uterine pacemaker 220) that has a smaller form factor (e.g., omitting a display, one or more physical ports, or one or more dials for user-control of the generated electrical modulation). The intravaginal electrode carrier 210 may be curvilinear in shape (i.e., the housing may be curvilinear). The electrodes 920 may be cervix-facing. That is, the electrodes 920 may be located on one side of the intravaginal electrode carrier 210 that is positioned to be in contact with the cervix. In some embodiments, the exposed sensing and modulating electrodes 920 contact the posterior vaginal fornix. When the intravaginal electrode carrier 210 is fastened and positioned properly, it may measure electroactivity of the uterus and apply electrical modulation to control contractions induced by the myometrium 950.

The intravaginal electrode carrier 210 may be inserted through the vagina 930 and positioned to contact the cervix 960. The end of the strap 940 may be passed through a locking mechanism to form a ring that is greater than the circumference of the cervix 960 at the point where the intravaginal electrode carrier 210 is placed. The looped strap carrying the intravaginal electrode carrier 210 may be slid upward so that the intravaginal muscle controller system of the intravaginal electrode carrier 210 and the wireless uterine pacemaker is properly placed against the cervico-vaginal area of the posterior fornix. Using a straight clamp, the tongue of the strap support 940 may be pulled so that the strap support 940 is holding the intravaginal muscle controller system in the proper location. The strap support 940 may be fastened around the bottom of the cervix 960, circling around the lateral vaginal fornixes 910. Parenthetically, this embodiment may compress the endocervix, thus supporting the role of the emplacement in maintaining a long, closed endocervix. The mounted intravaginal electrode carrier 210 may be removed by clipping the strap support 940 with a blunt clipper.

Figure 10A:
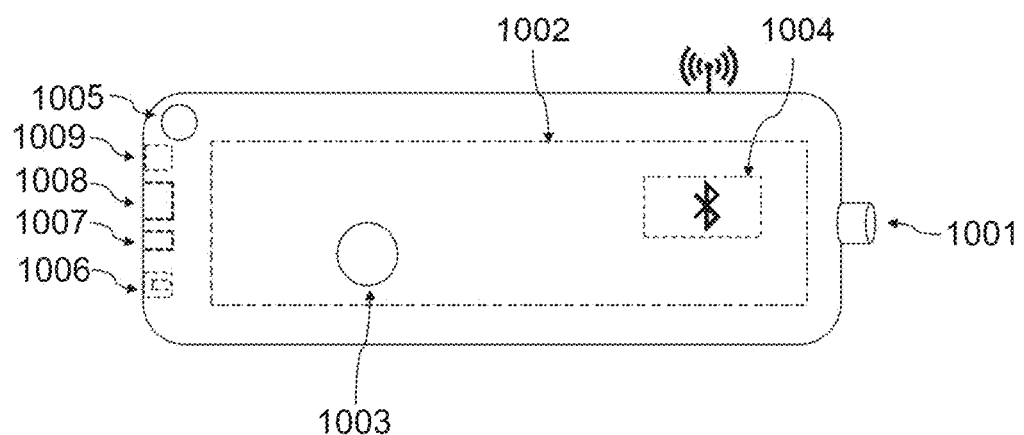
FIG. 10A shows a front view of a connector, according to at least one embodiment.
Figure 10B:
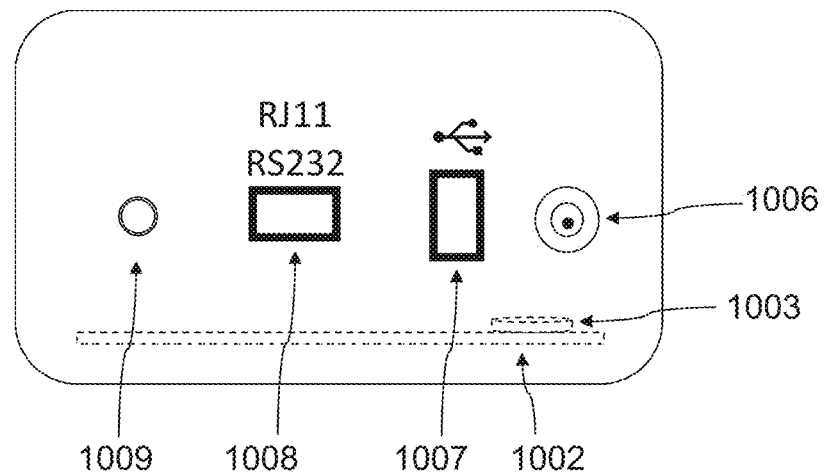
FIG. 10B shows a side view of the connector of FIG. 10A, according to at least one embodiment.

FIGS. 10A and 10B show the connector 180 of FIGS. 1A and 1B, according to at least one embodiment. FIG. 10A shows a front view of the connector 180 and FIG. 10B shows a side view of the connector 180. The connector 180 includes an output port 1001, a processor 1002, a battery 1003, a wireless communication circuit 1004, an LED 1005, a universal serial bus (USB) input port 1007, a registered jack 11 (RJ11) or recommended standard 232 (RS232) input port 1008, and an override device input port 1009. The connector 180 may have alternative configurations than shown in FIGS. 10A and 10B, including for example different, fewer, or additional components. For example, in a wireless configuration of the connector 180, the output port 1001 may be omitted and instead, data output from the connector 180 may be communicated via the wireless communication circuit 1004 to a uterine pacemaker (e.g., to the wireless communication circuit 340 of uterine pacemaker 220).

Data may be exchanged with the connector 180 through various manners of input and output. The output port 1001 and the override device input 1009 may be communication interfaces through which data is exchanged. For example, the output port 1001 may be used to transmit or output a triggering signal to a uterine pacemaker. Additionally, the override device input port 1009 may be used to receive instructions from an override device (e.g., the override device 1130) including instructions to modify the electrical modulation generated by the uterine pacemaker (e.g., pausing or reducing the amplitude of the modulation). The connection coupled at the ports 1001 and 1009 can include, but is not limited to, one or more electrical cables such as cables with pin structures compatible with the Recommended Standard 232 (RS232) or universal serial bus (USB) protocols. The ports 1001 and 1009 may be serial ports, parallel ports, USB ports, or any suitable data communication port capable of transmitting data to a uterine pacemaker.

The wireless communication circuit 1004, although depicted as using the Bluetooth protocol, may enable the connector 180 to receive uterine muscle activity data and transmit triggering signals over a suitable network as described within the description of FIG. 2. The USB input port 1007 and RJ11 or RS232 input port 1008 may be used for sources of data for the connector 180 to generate a triggering signal based on data from monitoring devices such as a tocodynamometer. For example, an EMG sensor with a USB connector may couple with the USB input port 1007 of the connector 180.

The processor 1002 may represent one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. The processor 1002 may also be one or more special-purpose processing devices such as an application specific integrated circuit (ASIC), a field programmable gate array (FPGA), a digital signal processor (DSP), network processor, or the like. The processor 1002 may be configured to execute instructions for performing the operations and steps described herein for generating a triggering signal based on data describing a patient's uterine muscle activity or instructions from the patient. As referred to herein, a processor of any computing system (e.g., the uterine pacemaker, the user device, the medical personnel device, etc.) may be similar to the processor 1002.

The connector 180 may be powered by the battery 1003. In some embodiments, the battery 1003 is rechargeable. Although not depicted, the connector 180 may have an input port for power to recharge the battery 1003. Alternatively, or additionally, the connector 180 may be configured for wireless recharging of the battery 1003. The LED 1005 may be one or more LED's that indicate an operational status of the connector 180. The operational status may be determined by the processor 1002. For example, the processor 1002 may determine that the battery 1003 needs to be recharged and cause the LED 1005 to turn on, indicating that the battery 1003 is at a low power.

FIGS. 11-13 depict various operational configurations of the connector 180 coupled to the uterine pacemaker 120 or 220 and the medical personnel device 140, according to at least one embodiment. The configurations may vary depending on various wired or wireless configurations of the connector 180, the uterine pacemaker 120 or 220, and the medical personnel device 140. Although not depicted, the connector 180 may be communicatively coupled to the user device 170 over a wireless network to display measured uterine muscle activity on the user device 170. The configurations further include an override device 1130 coupled to the uterine pacemaker 120 or 220. Additionally, the external uterine contraction monitor 130 provides measured uterine muscle activity data to at least one of the medical personnel device 140 and the connector 180.

FIG. 11 shows a first configuration 1100 where the connector 180 is communicatively coupled with the uterine pacemaker 120 that is outside of the body via a wired connection. The connector 180 is also communicatively coupled via a wired connection to the medical personnel device 140. The connector 180 may receive data measured from the external uterine contraction monitor 130 and provided to the medical personnel device 140. In some embodiments, the connector 180 may pass the uterine muscle activity data through to the uterine pacemaker 120. Alternatively, or additionally, the connector 180 may include one or more processors to determine a triggering signal to instruct the uterine pacemaker 120 to generate electrical modulation. The override device 1130 is connected via a wired connection to the uterine pacemaker 120.

FIG. 12 shows a second configuration 1200 where the connector 180 is communicatively coupled with the uterine pacemaker 220 via a wireless connection. The override device 1130 is connected via a wired connection to the uterine pacemaker 220. The connector 180 is connected via a wired connection to the medical personnel device 140. Similar to FIG. 11, the connector 180 may receive data measured from the external uterine contraction monitor 130 and transmit the data to the uterine pacemaker 220 for the uterine pacemaker 220 to determine a triggering signal for generating electrical modulation. The connector 180 in FIG. 12 is configured to wirelessly transmit uterine muscle activity data to the uterine pacemaker 220 (e.g., the connector 180 is equipped with wireless communication circuitry).

FIG. 13 shows a third configuration 1300 where the connector 180 is communicatively coupled to the external uterine contraction monitor 130 via a wired connection and wirelessly coupled to the uterine pacemaker 220. Similar to FIGS. 11 and 12, the connector 180 may receive data measured by the external uterine contraction monitor 130 and transmit the data to the uterine pacemaker, which may then determine a triggering signal for generating electrical modulation. In the configuration 1300, the medical personnel device 140 may serve as a display for uterine muscle activity data measured by either the intravaginal electrode carrier 210 or the external uterine contraction monitor 130. The uterine pacemaker 220 may wirelessly transmit data measured by the intravaginal electrode carrier 210 to the medical personnel device 140. The connector 180 may include an input port to interface with a data output connector from the external uterine contraction monitor 130 via a wired connection.

In FIGS. 11-13, one or more of the external uterine contraction monitor 130 and the intravaginal electrode carrier 110 or 210 may provide measured uterine muscle activity data to the connector 180. The connector 180 may use the data from either source to provide to the medical personnel device 140 for display or if equipped with a processor to make the determination, determine a triggering signal for the uterine pacemaker to generate electrical modulation. After the electrical modulation is applied, subsequently measured uterine muscle activity data taken by either the intravaginal electrode carrier or received from the external uterine contraction monitor via the connector may be used by the uterine pacemaker to modify the electrical modulation generated. In this way, a feedback loop may be created with the connector 180 and at least one of the intravaginal electrode carriers and the external uterine contraction monitor.

The override device 1130 in FIGS. 11-13 is a handheld device with an input configured to receive a patient's instructions to pause operation of the uterine pacemaker 120 or 220 or reduce the power of the electrical modulation generated by the uterine pacemaker 120 or 220. While the override device 1130 is depicted as being communicatively coupled to the uterine pacemaker via wires, the override device 1130 may be equipped with wireless communication circuitry such that it may communicate wirelessly. Additionally, although depicted as a separate device, the override device 1130 may be implemented as a software application on the user device 170. Examples of user interfaces for such software applications to control a uterine pacemaker via the user device 170 are shown in FIGS. 18 and 19. In some embodiments, the override device 1130 may also be configured to receive a patient's instructions for pausing or modifying the operation of the uterine pacemaker similar to the function of the software applications described in FIGS. 18 and 19.

FIGS. 14A-B, 15A-B, and 16A-C show a uterine pacemaker and various accessories of the uterine pacemaker, according to at least one embodiment. In particular, the uterine pacemaker 120 that operates external to the body is depicted as having various power adapters and renewable energy generators. However, these features are not limited to the external uterine pacemaker and may be applied to the internal uterine pacemaker 220 configuration. For example, the intravaginal electrode carrier 210 and the uterine pacemaker 220 may be integrated into one device that is also equipped with the power adaptors as shown in FIGS. 16A-C.

Figure 14A:
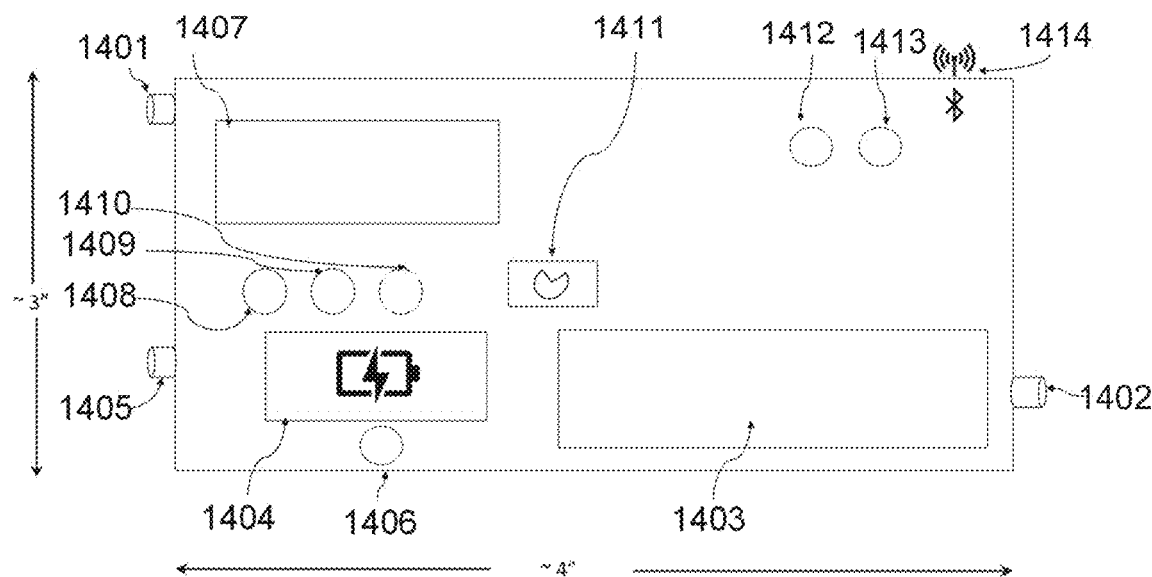
FIG. 14A shows a front view of a uterine pacemaker, according to at least one embodiment.
Figure 14B:
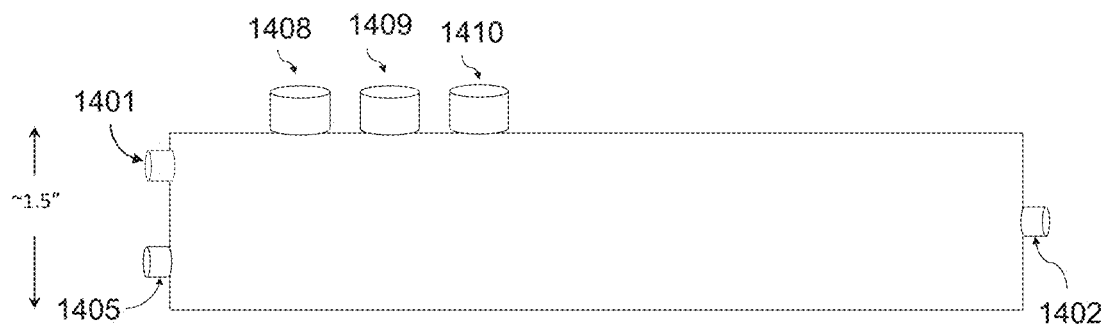
FIG. 14B shows a bottom view of the uterine pacemaker of FIG. 14A, according to at least one embodiment.

FIGS. 14A and 14B show the uterine pacemaker 120 of FIGS. 1A and 1B. FIG. 14A shows a front view of the uterine pacemaker 120 and FIG. 14B shows a bottom view of the uterine pacemaker 120. The uterine pacemaker 120 includes a signal input port 1401, a modulation output port 1402, a processor 1403, a battery 1404, a power input 1405, a power level indicator LED 1406, a display 1407, control knobs 1408-1410, a power switch 1411, a power indicator LED 1412, a modulation indicator LED 1413, and wireless communication circuitry 1414. The uterine pacemaker 120 may be a rectangular shape with approximate dimensions of four inches in length, three inches in width, and one and a half inches in height. The uterine pacemaker 120 may have alternative configurations than shown in FIGS. 14A and 14B, including for example different, fewer, or additional components. For example, the LED's 1406, 1412, and 1413 may be omitted and the information communicated instead on the display 1407.

The signal input port 1401 may receive a triggering signal (e.g., from the connector 180) or uterine contraction data (e.g., from the intravaginal electrode carrier 110). The modulation output port 1402 outputs the generated electrical modulation to an intravaginal electrode carrier. The connection coupled at the signal input port 1401 can include, but is not limited to, one or more electrical cables such as cables with pin structures compatible with the RS232 or USB protocols. The signal input port 1401 may a serial port, parallel port, USB port, or any suitable data communication port capable of the triggering signal instructions to the uterine pacemaker 120. The connection coupled at the modulation output port 1402 can include, but is not limited to, one or more electrical cables (e.g., the electrode leads) for applying electrical modulation to the patient's uterus. The signal input port 1401 may a serial port, parallel port, USB port, or any suitable data communication port capable of the triggering signal instructions to the uterine pacemaker 120. The wireless communication circuit 1414 may also be used to communicate data as received through the signal input port 1401.

The processor 1403 may represent one or more processors such as a microprocessor, a central processing unit, or the like. Similar to the processor 1002, the processor 1403 may be a CISC microprocessor, RISC microprocessor, VLIW microprocessor, or a processor implementing other instruction sets, or processors implementing a combination of instruction sets. The processor 1403 may also be one or more special-purpose processing devices such as an ASIC, an FPGA, a DSP, a network processor, or the like. The processor 1403 may be configured to execute instructions for performing the operations and steps described herein for generating electrical modulation based on data describing a patient's uterine muscle activity, instructions from the patient, or a triggering signal provided by the connector 180.

The battery 1404 may power the uterine pacemaker 120. The battery 1404 may be a rechargeable battery that is recharged via the power input 1405. The uterine pacemaker 120 may be powered on and off via the power switch 1411. The power level indicator LED 1406 may indicate that the battery 1404 is at a particular level. For example, the power level indicator LED 1406 may turn on when the battery 1404 has less than 20% of its power capacity remaining. The power indicator LED 1412 may indicate that the uterine pacemaker 120 is powered on. The modulation indicator LED 1413 may indicate when the uterine pacemaker 120 is applying electrical modulation. The display 1407 may display characteristics (e.g., waveform parameters as used by the waveform generator 332) or a graph of the waveform of the electrical modulation generated. The display 1407 may be a liquid crystal display (LCD). In some embodiments, the display 1407 may display the information communicated by the LED's 1406, 1412, or 1413 (e.g., the percentage of power capacity remaining in the battery 1404).

Figure 15A:
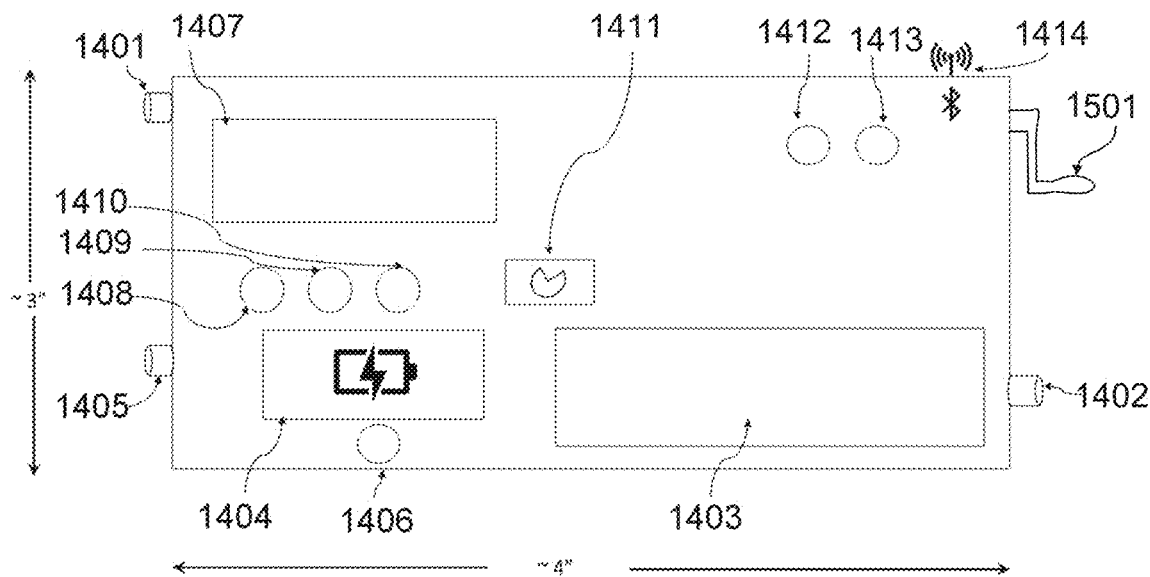
FIG. 15A shows a front view of a uterine pacemaker with power inputs adapted for various international power connection types, according to at least one embodiment.
Figure 15B:
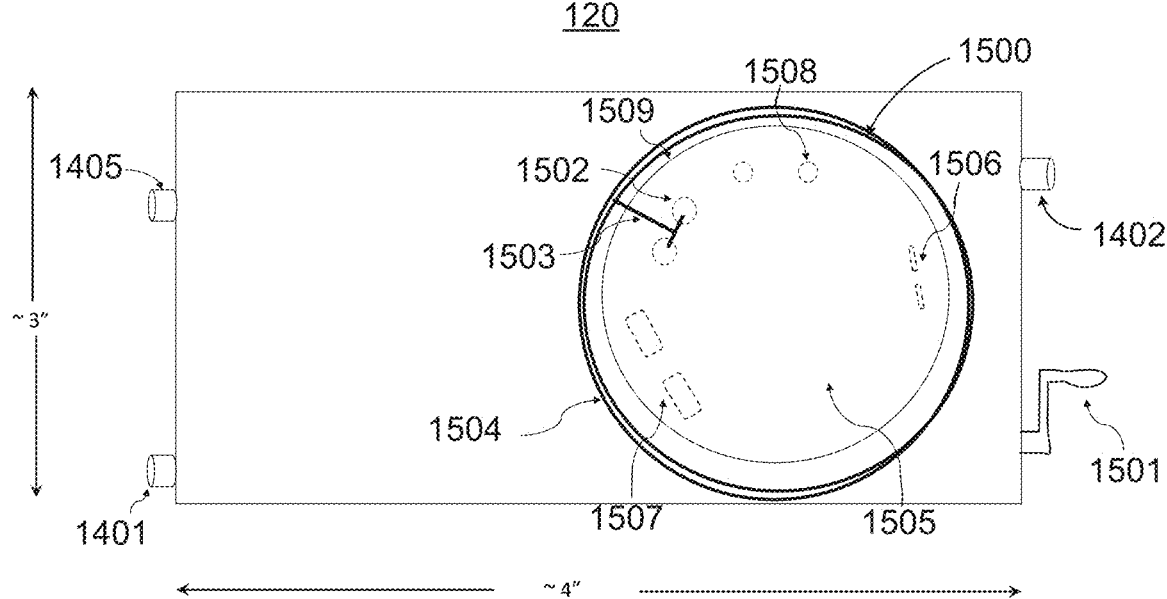
FIG. 15B shows a rear view of the uterine pacemaker of FIG. 15A, according to at least one embodiment.

FIGS. 15A and 15B show the uterine pacemaker 120 of FIGS. 14A and 14B with power inputs adapted for various international power connection types. FIG. 15A shows a front view of the uterine pacemaker 120 and FIG. 15B shows a rear view of the uterine pacemaker 120. The uterine pacemaker 120 may include components as described in FIGS. 14A and 14B in addition to a crank 1501 and a power adaptor assembly 1500. The power adaptor assembly 1500 may include electrical contact buttons 1502, an electrical connection 1503 from an electrical cable 1504 to the electrical contact buttons 1502, the electrical cable 1504, a back plate 1505, international electrical power plugs 1506-1508, and a plug adaptor 1509. The uterine pacemaker 120 may have alternative configurations than shown in FIGS. 15A and 15B, including for example different, fewer, or additional components. For example, the power adaptor assembly 1500 is shown as having three types of international electrical power plugs, but may have fewer or additional types to, for example, increase the compatibility of the uterine pacemaker 120 with various power outlets.

The crank 1501 may be a manually powered crank that generates electricity to charge the battery 1404 as the crank 1501 is actuated. The power adaptor assembly 1500 may be located within a circular recess at the rear of the uterine pacemaker 120. The plug adaptor 1509 of the power adaptor assembly 1500 may be rotatable such that one of the international electrical power plugs 1506-1508 may be selected for the appropriate electrical outlet. The plug adaptor 1509 may be rotated to create a path for electricity between the selected international electrical power plug inserted into an electrical outlet and the electrical contact buttons 1502. The path for electricity may extend further from the electrical contact buttons 1502, through the electrical connection 1503 and the electrical cable 1504. In some embodiments, the electrical cable 1504 may connect the power adaptor assembly 1500 to the battery 1404 (e.g., to recharge the battery 1404). Thus, the connection between the uterine pacemaker 120 and an electrical outlet facilitated by the power adaptor assembly 1500 may power the uterine pacemaker 120. The power assembly 1500 is further described in the description of FIGS. 16A-C.

FIGS. 16A-C show a power adaptor assembly 1500 of the uterine pacemaker 120 of FIGS. 15A and 15B. FIG. 16A shows a front view of the power adaptor assembly 1500, FIG. 16B shows a side view of the power adaptor assembly 1500, and FIG. 16C shows a top view of the power adaptor assembly 1500. The electrical power plugs 1506-1508 may be structured to fold or retract into the plug adaptor 1509. The plug adaptor 1509 may rotate around the back plate 1505, which may be fixed to the uterine pacemaker 120. The international electrical power plugs 1506-1508 may include outlets used in the United States such as Type A or Type B, outlets used in Europe such as Type C, outlets used in China such as Type I, or any suitable plug according to the International Electrotechnical Commission International Standards. The electrical contact buttons 1502 may be located on the surface of the back plate 1505 and contact an exposed, conductive surface on the plug adaptor 1509 that is electrically coupled to the international electrical power plugs 1506-1508. Although not shown, the plug adaptor 1509 may be coupled at the center of the back plate 1505 using a pivot or rotating mechanism of, for example, a double-ended threaded stud and a set of nuts.

Figure 17A:
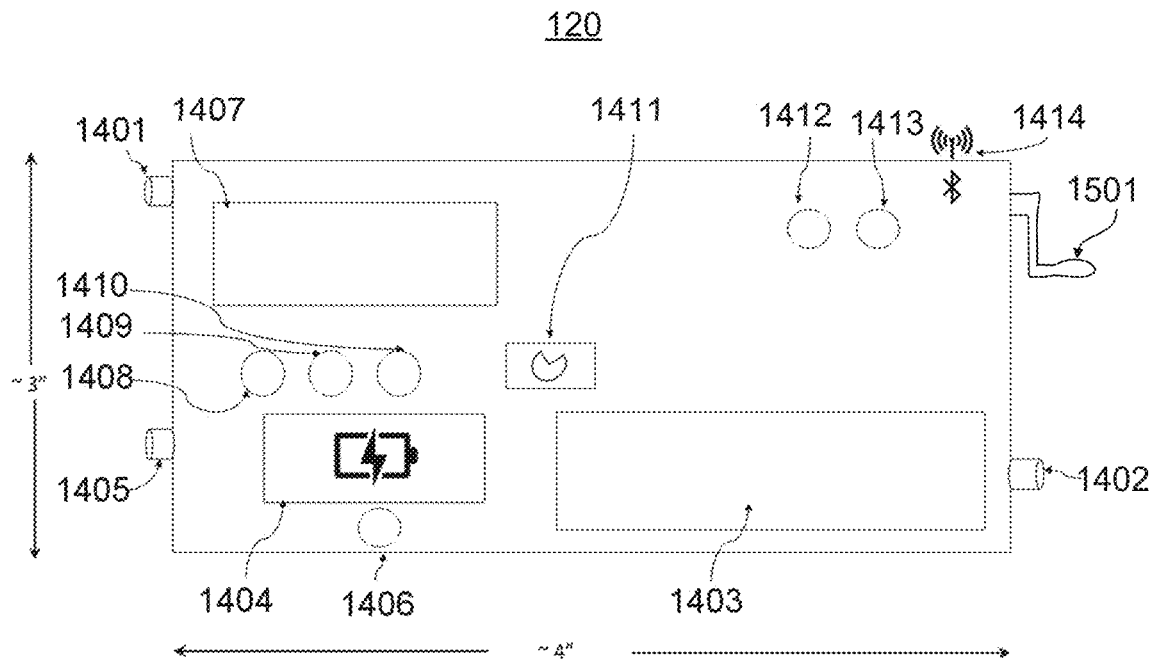
FIG. 17A shows a front view of a uterine pacemaker for use in a low resource environment, according to at least one embodiment.
Figure 17B:
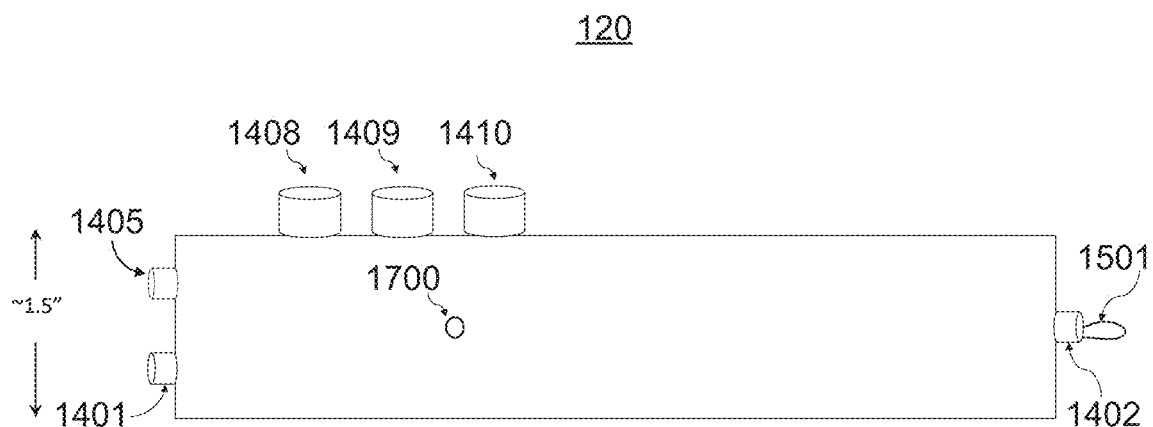
FIG. 17B shows a bottom view of the uterine pacemaker of FIG. 17A, according to at least one embodiment.

FIGS. 17A-E show the uterine pacemaker 120 of FIGS. 14A and 14B with accessories for use in a low resource environment. FIG. 17A shows a front view of the uterine pacemaker 120, FIG. 17B shows a bottom view of the uterine pacemaker 120, FIG. 17C shows a top view of the uterine pacemaker 120, FIG. 17D shows a rear view of the uterine pacemaker 120, and FIG. 17E shows an isometric view of the uterine pacemaker 120. The uterine pacemaker 120 may include components as described in FIGS. 14A and 14B in addition to photovoltaic panels 1701 and 1702 and an external power source input 1700. The external power source input 1700 may be coupled to an external alternating current (AC) power source. The patient may be isolated from the AC line current. The photovoltaic panels 1701 and 1702 may be arrays of photovoltaic or solar cells. The uterine pacemaker 120 may have alternative configurations than shown in FIGS. 17A-E, including for example different, fewer, or additional components. For example, the uterine pacemaker 120 may include a rotating mechanism for the photovoltaic panels 1701 and 1702. The processor 1403 may be programmed to sense that the voltage generated from the photovoltaic panels 1701 and 1702 is below a threshold voltage and rotate the photovoltaic panels 1701 and 1702 to maintain a minimum level of voltage generated.

Uterine Contraction Monitoring and Control Interfaces

Referring now to FIGS. 18 and 19, illustrated are examples of user interfaces for displaying the uterine contractions as measured by an intravaginal electrode carrier and adjusting the electrical modulation generated by a uterine pacemaker. The user interfaces may be used for at-home use of the intravaginal electrode carrier 210 and uterine pacemaker 220 by the patient 150. For example, a monitoring interface may be used when the medical personnel device 140 displaying monitored data is not available to the patient 150. Further in this example, a modulation control interface may be used by the patient when the doctor 160 is not present to adjust the electrical modulation applied by the uterine pacemaker 220.

FIG. 18 depicts a user interface 1800 as displayed on the user device 170, according to at least one embodiment. The user interface 1800 includes a summary panel 1810, a live monitoring panel 1820, a monitoring window icon 1830, an electrical modulation control window icon 1840, a doctor contact window icon 1850, and a settings window icon 1860. The user interface 1800 may have alternative configurations than shown in FIG. 18, including for example different, fewer, or additional components. For example, the user interface 1800 may include a button for sending a message to the doctor 160 regarding the monitored data, which may cause the doctor contact window to be displayed upon selection.

The summary panel 1810 may include summary statistics of the condition of the patient's 150 body such as contraction activity, blood pressure, heart rate, the condition of the baby such as the fetal heart rate, any suitable statistic describing the condition of the body, or a combination thereof. The live monitoring panel 1820 may display data measured from the intravaginal electrode carrier 110 or 210, the external uterine contraction monitor 130, or a combination thereof. As depicted in FIG. 18, the live monitoring panel 1820 displays a live feed of the fetal heart rate and the patient's 150 contractions over time.

The monitoring window icon 1830 may be used to select, an electrical modulation control window icon 1840, a doctor contact window icon 1850, and a settings window icon 1860

FIG. 19 depicts a user interface 1900 as displayed on the user device 170, according to at least one embodiment. The user interface 1900 includes a modulation selection panel 1910, a modulation summary panel 1920, the monitoring window icon 1830, the electrical modulation control window icon 1840, the doctor contact window icon 1850, and the settings window icon 1860. The user interface 1900 may have alternative configurations than shown in FIG. 19, including for example different, fewer, or additional components. For example, the user interface 1900 may include a button for requesting that a doctor add or modify the available modulation settings shown in the modulation selection panel 1910. Alternatively, or additionally, the user interface 1900 may include toggles for the patient 150 to adjust her own electrical modulation settings used by the uterine pacemaker 120 or 220.

The modulation selection panel 1910 includes one or more selectable electrical modulation settings that may be predefined or prescribed by the doctor 160. The patient 150 may select any one of the settings to adjust the electrical modulation applied by the uterine pacemaker 120 or 220. Each setting may be characterized by various waveform parameters (e.g., amplitude and duty cycle of the electrical modulation waveform). The modulation summary panel 1920 displays a summary of the settings selected from the modulation selection panel 1910. The modulation summary panel 1920 may include a listing of the waveform parameters associated with the selected setting or a graph displaying a live feed of the applied modulation.

Processes for Monitoring and Controlling Uterine Contractions

Figure 20:
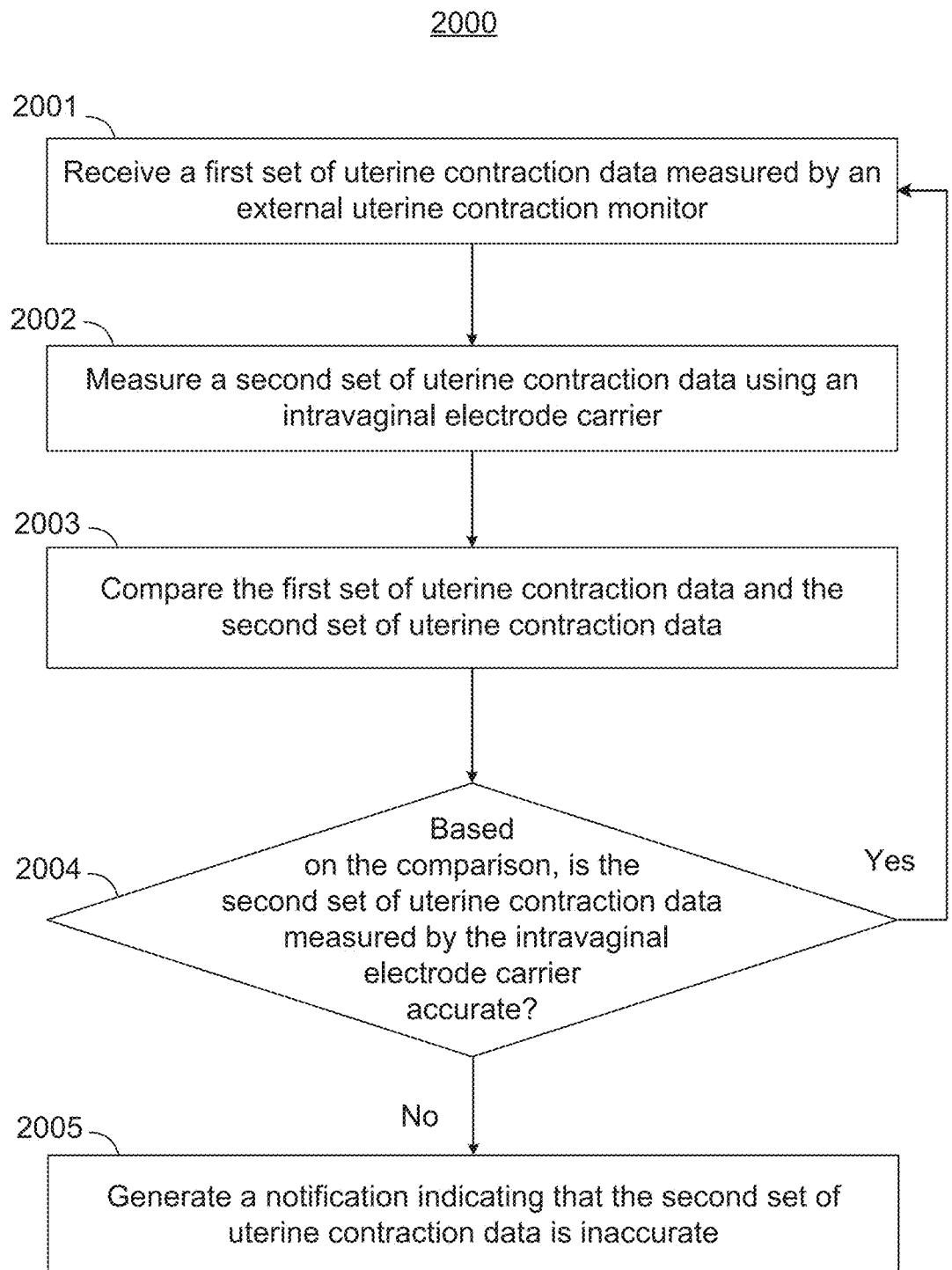
FIG. 20 is a flowchart illustrating a process for verifying the accuracy of uterine contraction data measured by an intravaginal electrode carrier, according to at least one embodiment.

FIG. 20 is a flowchart illustrating a process 2000 for verifying the accuracy of uterine contraction data measured by an intravaginal electrode carrier, in accordance with at least some embodiments. The process 2000 be performed by a uterine pacemaker (e.g., the uterine pacemaker 220). In some embodiments, the process 2000 involves additional, fewer, or different steps or entities for performing the steps. For example, the uterine pacemaker 220 may perform additional steps to determine a change in accuracy over time to reduce false positive determinations of inaccuracy. In some embodiments, the steps of the process 2000 may be performed in alternate orders. For example, the measuring 2002 of the second set of uterine contraction data may be performed in parallel or before the receiving 2001 the first set of uterine contraction data.

The uterine pacemaker 220 receives 2001 a first set of uterine contraction data measured by an external uterine contraction monitor (e.g., the external uterine contraction monitor 130). The first set of uterine contraction data may characterize the contractions experienced by the patient 150. The first set of uterine contraction data may include raw data measured from the external uterine contraction monitor 130 such as the measured voltage of uterine electroactivity measured by an EMG machine or processed data from the raw data such as the frequency of contractions detected within a period of time (e.g., an hour).

The uterine pacemaker 220 measures 2002 a second set of uterine contraction data using an intravaginal electrode carrier (e.g., the intravaginal electrode carrier 210). The second set of uterine contraction data may characterize the contractions experienced by the patient 150. The second set of uterine contraction data may be measured from within the body while the first set of uterine contraction data may be measured from the external surface of the body (e.g., over the abdomen of the patient). The second set of uterine contraction data may include raw data measured from the intravaginal electrode carrier 210 such as the voltage of uterine electroactivity measured using the sensing electrodes 321 of intravaginal electrode carrier 210. In some embodiments, the second set of uterine contraction data includes processed data from the raw data such as the change in amplitude of each detected contraction over time.

The uterine pacemaker 220 compares 2003 the first set of uterine contraction data and the second set of uterine contraction data. For example, the uterine pacemaker 220 may compare the change in amplitude of detected contractions over time from the first set of uterine contraction data and the same metric from the second set of uterine contraction data. The uterine pacemaker 220 may then determine 2004 whether the second set of uterine contraction data measured by the intravaginal electrode carrier 210 is accurate based on the comparison 2003. For example, the uterine pacemaker 220 may determine that the change in amplitude over time in the first data set differs from the second set by greater than a threshold percentage of, for example, microvolts per second (e.g., 50 uV/s).

In response to determining 2004 that the second set of uterine contraction data measured by the intravaginal electrode carrier 210 is accurate, the uterine pacemaker 220 may receive 2001 subsequent uterine contraction data from the external uterine contraction monitor 130. In response to determining 2004 that the second set of uterine contraction data is inaccurate, the uterine pacemaker 220 may generate 2005 a notification indicating that the second set of uterine contraction data is inaccurate. For example, the notification may include the results of the comparison 2003 and indicate that the inaccuracy in data may be related to improper placement of the intravaginal electrode carrier 210. In some embodiments, the uterine pacemaker 220 may transmit the generated notification to the medical personnel device 140 for display. In some embodiments, in response to determining 2004 that the second set of uterine contraction data measured by the intravaginal electrode carrier 210 is inaccurate, the process 2000 may return to receiving 2001 a subsequent set of measured uterine contraction data to determine if the inaccuracy continues. This may reduce a number of false positive notifications generated for supposedly inaccurate measurements (e.g., when the subsequent measurement is accurate).

FIG. 21 is a flowchart for illustrating a process 2100 for applying electrical modulation to the uterus to control contraction activity, in accordance with at least some embodiments. The process 2100 be performed by one or more of an intravaginal electrode carrier (e.g., the intravaginal electrode carrier 110 or 210), a uterine pacemaker (e.g., the uterine pacemaker 120 or 220), or a device integrating both the intravaginal electrode carrier and uterine pacemaker within the body. The process 2100 will be described herein as performed by an intravaginal muscle controller system combining the intravaginal electrode carrier and the uterine pacemaker. In some embodiments, the process 2100 involves additional, fewer, or different steps or entities for performing the steps. For example, the intravaginal muscle controller system may measure the electrical conductivity at the cervico-vaginal tissue and maximize the applied power of the electrical modulation.

The intravaginal muscle controller system measures 2101 electroactivity data of the uterus using one or more sensing electrodes (e.g., the sensing electrodes 321) contacting the cervico-vaginal tissue of a patient's uterus (e.g., the patient 150). The electroactivity data may be representative of uterine contractions. For example, the higher value of voltage measured at the sensing electrodes 321 is indicative of more forceful contractions of uterine muscles (e.g., cervico-vaginal tissue).

The intravaginal muscle controller system receives 2102 the measured electroactivity data. For example, the electroactivity data measured at the sensing electrodes 321 is transmitted through one or more electrode leads (e.g., the electrode leads 470) to the uterine pacemaker of the intravaginal muscle controller system (e.g., via an input port such as the port 1401).

The intravaginal muscle controller system generates 2103 electrical modulation based on the received 2102 electroactivity data. The intravaginal muscle controller system may detect one or more contractions within the received 2102 electroactivity data. The intravaginal muscle controller system may use a detected contraction to determine that electrical modulation should be activated (e.g., for how long and with what waveform parameters). In some embodiments, the intravaginal muscle controller system may identify characteristics of the contractions (e.g., amplitude or frequency) and use the identified characteristics to determine waveform parameters of the electrical modulation. For example, if the identified frequency is above a predefined contraction frequency, the intravaginal muscle controller system may determine a waveform with a larger duty cycle to generate for the electrical modulation.

The intravaginal muscle controller system transmits 2104 the electrical modulation to one or more modulating electrodes (e.g., the modulating electrodes 322). For example, the intravaginal muscle controller system may use an output port such as the output port 1402. The intravaginal muscle controller system then applies 2105 the electrical modulation to the uterus using the modulating electrodes 322, which may contact the cervico-vaginal tissue. Although not depicted, the process 2100 may return to measuring 2101 the electroactivity at the cervico-vaginal tissue after the electrical modulation was applied, repeating the process 2100 to adjust the electrical modulation generated. Hence, the intravaginal muscle controller system may implement a closed loop feedback system for monitoring and controlling uterine contractions.

Experiments and Findings

Referring now to FIGS. 22 through 28, illustrated are experimental findings of the uterine contraction control as performed by the intravaginal electrode carrier and uterine pacemaker described herein.

Figure 22:
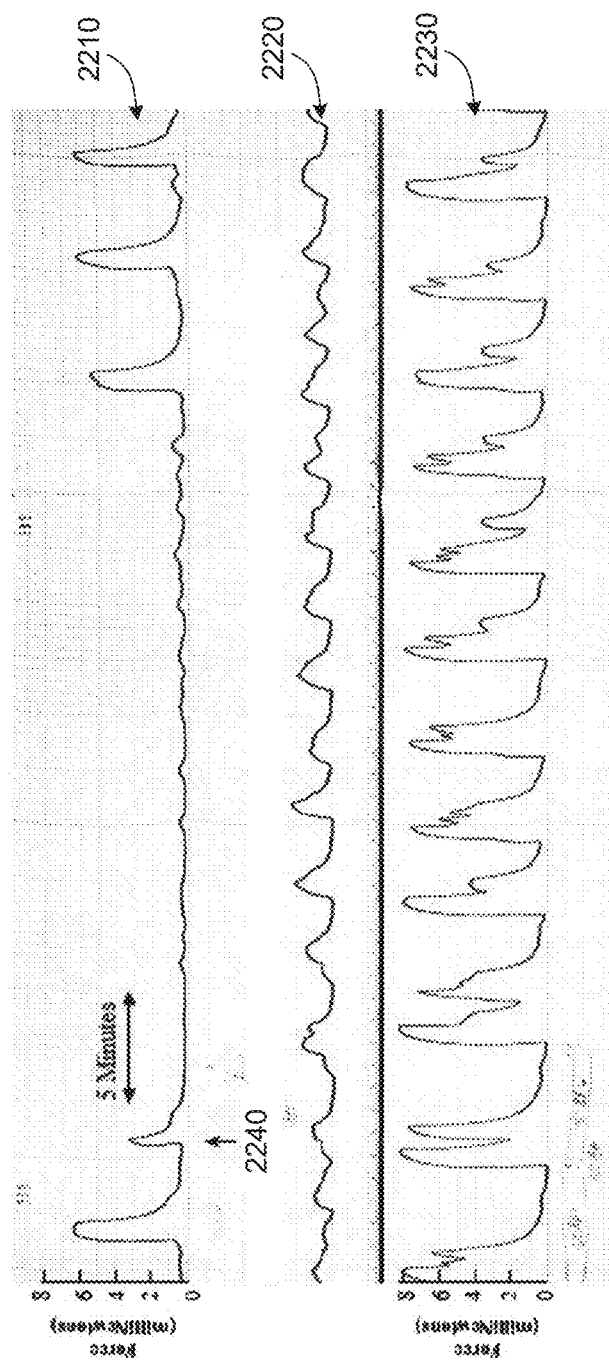
FIG. 22 shows an experimental finding of a comparison of contraction activity with and without electrical modulation as generated by a uterine pacemaker.

FIG. 22 shows a comparison of contraction activity with and without electrical modulation as generated by a uterine pacemaker. In particular, the graphs shown in FIG. 22 depict the results of an in vitro human study. The x-axis is time (minutes) and the y-axis is tension (millinewtons). Each upstroke is a contraction. The contraction activity represented by the data set 2210 with electrical modulation applied at a timepoint 2240 shows that contractions were inhibited. The electrical modulation was applied for approximately 15 seconds and inhibited contractions for greater than thirty minutes. However, the contraction activity represented by the data sets 2220 and 2230 without electrical modulation applied (i.e., controls in the experiment) show that contractions monitored from the same subject continued at a frequency of at least once every five minutes.

Figure 23:
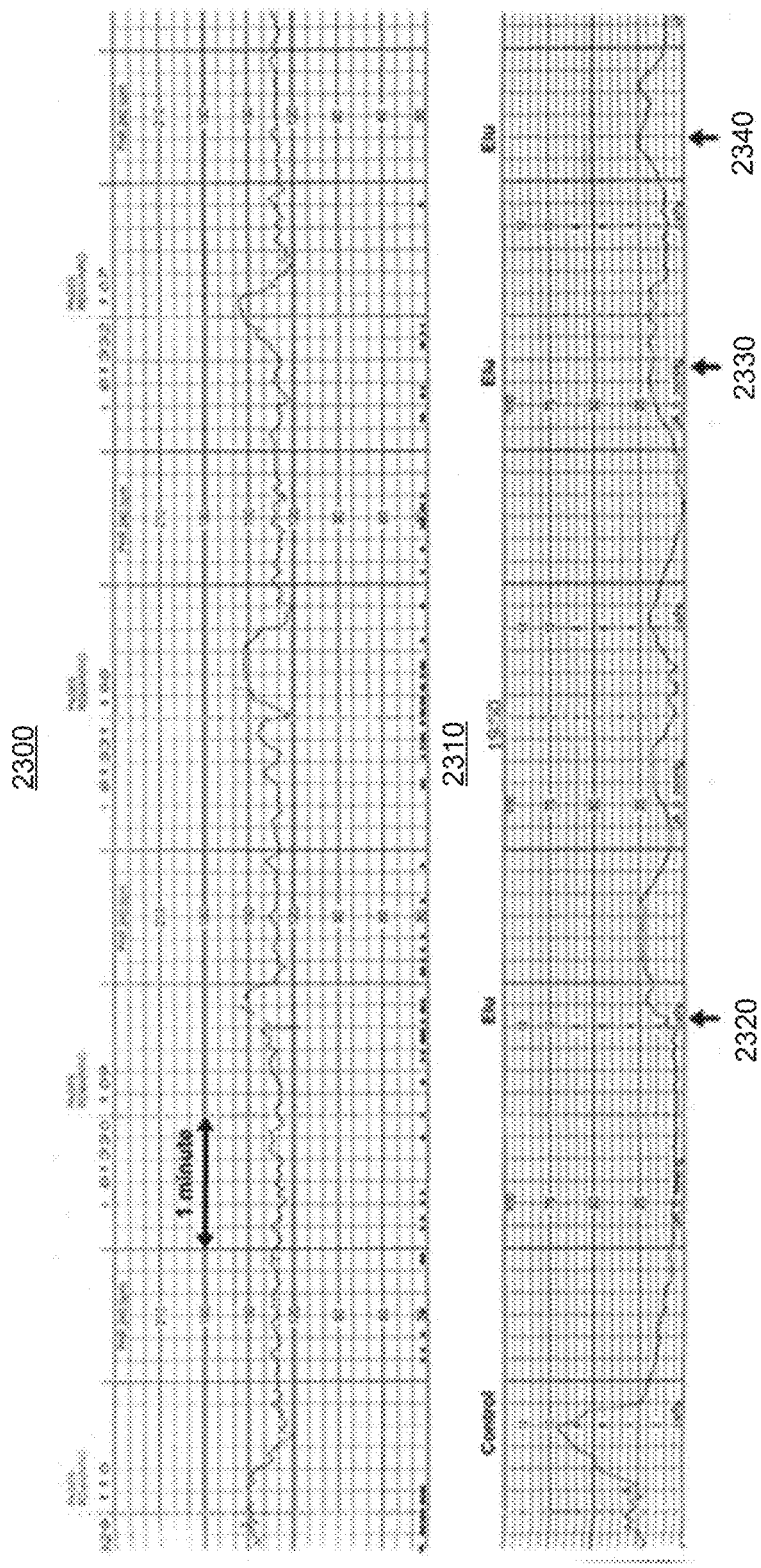
FIG. 23 shows an experimental finding of preterm uterine contractions inhibited using electrical modulation.

FIG. 23 shows preterm uterine contractions inhibited using electrical modulation. A uterine pacemaker delivered a weak electrical inhibition current to control preterm uterine contractions. Women in preterm labor had the uterine pacemaker and modulating electrodes placed vaginally and the current increased up to 17 mA. The uterine pacemaker intervened in contraction activity for a twenty minute period with twenty minutes of control time before and after the electrical modulation. The data set 2300 shows the fetal heart rate monitored throughout the study period. The data set 2310 shows the monitored human uterine contraction timing and subjective amplitude monitored during the study period. Outcome data (e.g., Apgars, complications, and hospital days) were obtained for mother and baby. The uterine pacemaker decreased the subjective amplitude of the contractions as shown by the amplitudes of contractions at timepoints 2320, 2330, and 2340 that are much lower than the amplitude of the contraction during the control time prior to the electrical modulation.

FIGS. 24-28 show EHG and EMG recordings taken with and without the application of electrical modulation. FIG. 24 shows the recorded EHG data 2400 and the recorded EMG data 2410 during a time period with electrical modulation occurring before and after control times. Patients monitored for this study were in preterm labor between 24-34 weeks gestation. The uterine pacemaker and intravaginal electrode carrier with a catheter housing was used, where the catheter housing was placed into the vagina adjacent to the posterior cervix under ultrasound guidance. The three study periods shown in FIG. 24 includes twenty minutes before the electrical modulation, twenty minutes of electrical modulation, and twenty minutes after the electrical modulation. Each time period was measured electronically providing the EHG data 2400 and the EMG data 2410. The EMG data 2410 shows the preterm uterine electrical activity during the control period, which includes a time period 2411, and during the electrical modulation, which includes a time period 2412.

Figure 26:
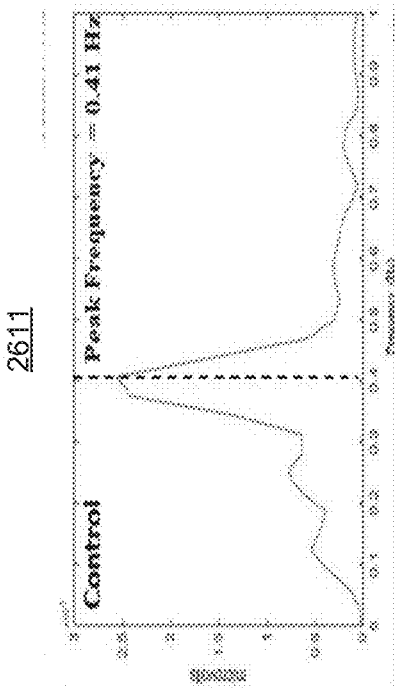
FIG. 26 shows a peak frequency of the uterine muscle activity during a contraction without electrical modulation during the first control time of FIG. 24.
Figure 28:
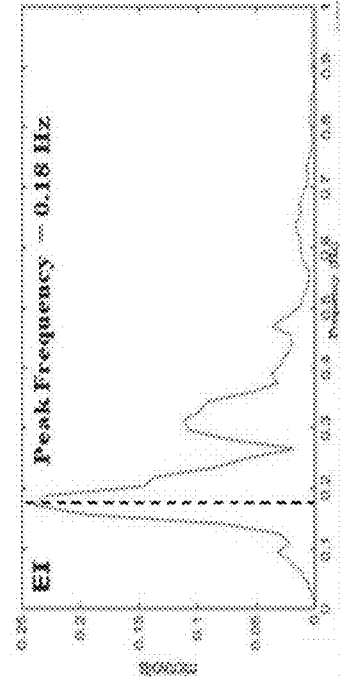
FIG. 28 shows a peak frequency of the uterine muscle activity during a contraction without electrical modulation during the electrical modulation of FIG. 24.
Figure 25:
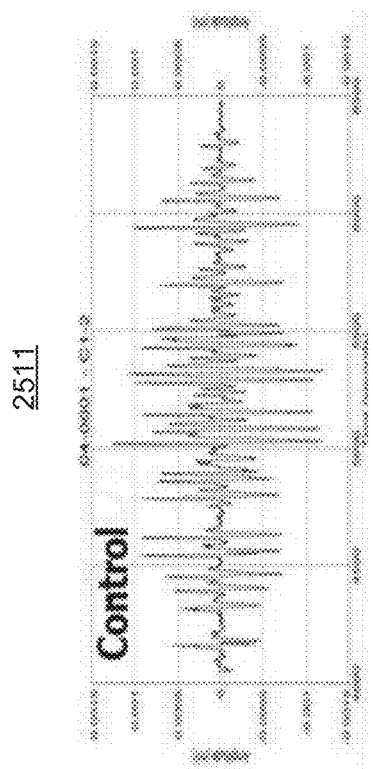
FIG. 25 shows an expanded view of the recorded EMG data of FIG. 24 during the first control time
Figure 27:
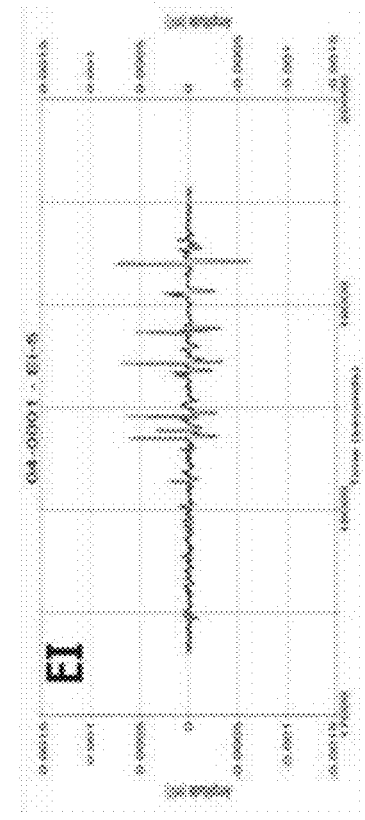
FIG. 27 shows an expanded view of the recorded EMG data of FIG. 24 during electrical modulation.

FIG. 25 shows an expanded view of the recorded EMG data 2410 during a time period 2411 during the first control time. FIG. 26 shows a peak frequency of the uterine muscle activity during a contraction without electrical modulation during the first control time of FIG. 24. FIG. 27 shows an expanded view of the recorded EMG data 2410 during a time period 2412 during electrical modulation. FIG. 28 shows a peak frequency of the uterine muscle activity during a contraction without electrical modulation during the electrical modulation of FIG. 24. The frequency of contractions occurring during electrical modulation is approximately 40% lower than the frequency of contractions occurring during the control time. Additionally, the average magnitude of the EMG data indicative of the force of the uterus muscles contracting is lower during electrical modulation than during the control time. The study further showed that the current applied by the intravaginal electrode carrier was measurable throughout the whole uterus, the electrical modulation decreased the uterine contraction activity, and the electrical modulation is more efficient and faster acting than published pharmaceutical stimulation. For example, electrical inhabitation was associated with a 30.5% decrease in uterine electrical activity when compared to atosiban, progesterone, and nifedipine. The electrical modulation had the fastest rate of decrease in uterine muscle activity of 93%/hour as compared with nifedipine at 29%/hour, progesterone at 11%/hour, and atosiban at 5%/hour.

In further trials and studies, the intravaginal muscle controller system is used in animal and/or human subjects.

In a first study, uterine contractions during pre-term labor (PTL) will be interdicted by the system described throughout this specification. The rationale for this first study is based on previous studies that have shown that electrical modulation (e.g., electrical inhibition or EI) can interrupt induced uterine contractions in animal models. The application of EI to the human cervico-vaginal mucosa has been included in previous studies of the system. The studies showed that this application of EI can increase the inter-contraction interval and both subjective and objective force of spontaneous uterine contractions. For the first study, changes in the length of EI application at the beginning of increased uterine activity will be used to show inhibition of active PTL contractions.

The experimental method of the first study is described herein. All PTL women will be evaluated for evidence of infection, cervical factors and any other known causes of PTL. Only women who are free of these "extraneous factors" will be enrolled. After establishing that the subject in in active PTL the intravaginal electrode carrier (in the catheter configuration) will be placed in the posterior fornix of the vagina. The subject will receive 2 second bursts of EI current at the beginning of contractions (noted by changes in the tocodynamometer tension (TOCO) or increased uterine electrical activity (i.e., EMG)). The experimental paradigm will be a 20-minute control period of observation and monitoring of uterine activity by TOCO and EMG (C1) followed by a 20-minute treatment period (E1) followed by a 20-minute control period (C2). The uterine pacemaker is external and controlled by the operator. The strength and length of each burst of EI will be increased according to a pre-arranged program designed to increase EI exposure to the point of extinguishing the contraction. The limits of each EI exposure (mA and seconds) have been approved by the FDA under the investigational device exemption (IDE) application for FDA approval of the system as a device. These limitations will not be exceeded. Both the mother and fetus will be monitored for evidence of cardiovascular function and the mother will report subjective pain during the control and experimental periods.

For the first study, it is expected that increasing the length and/or strength of EI will result in increased suppression of uterine activity to the point of extinguishing pre-term contractions. There may be overhang of the effect so that after the experimental period the spontaneous contractions are less frequent, weaker, and/or shorter in duration. At the doses applied there should be no serious adverse effects.

The first study will show that application of the system via an intravaginal electrode carrier is capable of interdicting uterine muscle activity during PTL. The embodiments of the system with external or internal elements such as monitoring functions, pacemaking functions and various configurations of the controller will be used.

In a second study, the system will be used to lengthen the time to delivery of the subject's baby. The second study is based on the first study that will prove that EI can interdict PTL contractions. Based upon these results, the second study will utilize the parameters of EI determined to be effective and safe and attempt to delay the time to delivery compared to women at similar stages of PTL who do not receive EI.

The experimental method of the second study is described herein. This will be an open-label non-randomized clinical trial. Patients will be enrolled who are $24^{0/7}$ weeks (i.e., 24 weeks and 0 days) or more, but not more than $34^{0/7}$ weeks (i.e., 34 weeks and zero days) pregnant. Their cervices will be between 4-6 cm dilated. Women in PTL will be categorized according to their gestational length, cervical effacement and dilation and the stage of fetal engagement in the pelvis. The use of tocolytic treatments will be recorded as well as the apparent effect. Preventive treatment with progestin and treatment with betamethasone will be recorded. During the period of study, 15 women will receive EI using the above-described methodology. Once the interdiction of uterine contractions is established, the treatment will continue for at least one week during which the mother will receive betamethasone to induce fetal lung maturation. If feasible, the treatment will continue until $34^{0/7}$ weeks gestation and then be withdrawn. The treatment will start with the embodiment of the system that has an external pacemaker and an intravaginal electrode carrier with a catheter housing, as in the first study. If the patient can ambulate, this system embodiment may be replaced by wired or wireless versions of the system in order to encourage ambulation. If the attending physician orders it, the patient may be released to home where the wireless capability of the intravaginal muscle controller system will allow constant monitoring. During the period of treatment, it is expected that with a ratio of 4:1 there will be women who are admitted for PTL who have the same characteristics as the EI-treated subjects but do not join the EI group. These are the contemporaneous controls. All subjects and controls will be evaluated for progestin preventative treatment, cervical status at entry, labor progress, tocolytic and betamethasone treatment, gestational length at delivery, mode of delivery and post-partum fetal and maternal follow-up. Evaluation will utilize analysis of variance (ANOVA) statistical methods.

For the second study, it is expected that clinically matched subjects will show longer delays of delivery and greater fetal weight in the EI group. There may be less fetal complications among the EI-treated newborns. No serious adverse events due to EI treatment are expected. There may be fewer thrombo-embolic events in the early ambulated subjects, though the size of the groups is probably too small for statistical differences. The same may be for obstetrical complications such as post-partum hemorrhage. The use of contemporaneous controls will enable the rationale of the Multi-Center Randomized trial.

In a third study, there will be a multi-center trial against active PTL. This third study is based on the success of the first and second trials. At present, there are no successful methods of treatment of otherwise uncomplicated PTL.

The experimental method of the third study is described herein. Using the same entry inclusion and exclusion criteria, an RCT will be carried out. Due to the clinical exigencies of the clinical management of PTL this will not be a blinded study. Since all embodiments of the intravaginal muscle controller system meet FDA investigational device exemption (IDE) requirements for bench testing, the trial will utilize the embodiment of the intravaginal muscle controller system that has shown to be the most applicable in clinical use. This will be a judgement in which the clinical members of the multi-center trial staff will participate.

The third study will show the superiority of EI over no additional treatment. Since the trial will not interfere with usual clinical management, there should be little difference in such matters as prevalence of progestin prevention treatment, use of tocolytics, etc. There may be demonstrable fetal-newborn age for age at delivery differences in neonatal complications in favor of EI. The proof of superiority of electroceutical approaches to PTL will enable widespread use of this mode of treatment. This application has numerous embodiments that will facilitate this outcome.

Additional Considerations

Example benefits and advantages of the disclosed configurations include inhibiting or decreasing the function of smooth muscles. For example, inhibiting contractions within uterine muscles to reduce the likelihood of preterm births. In addition to inhibiting the function of smooth muscles, the disclosed configurations herein may increase the function of smooth muscles (e.g., to cause a uterine contraction and help induce labor). By changing the electrical waveform parameters the disclosed configurations may increase or decrease the function of smooth, cardiac, or striated muscles. Furthermore, measuring uterine muscle activity intravaginally, as described herein, may be more accurate than measuring the activity from outside of the body (e.g., via an EMG over the abdomen).

Additional advantages to the system described here include that both sensing of contractions and delivery of electrical stimulation can occur intravaginally. Sensing contractions via cervico-vaginal tissue presents additional challenges beyond external abdominal or remote sensing, which are overcome by the system described here. For example, the cervix is regularly changing in form and characteristics overtime during preterm labor and during pregnancy in general, so getting effective and consistent intravaginal readings and prediction of contractions is not a simple task. The system described here solves various problems in the conventional technology by providing a safer and less invasive way to monitor contractions while still providing accuracy in monitoring, and the system also provides the electrical stimulation needed to inhibit the contractions at the appropriate timing. The system can even be entirely wearable by a woman so that the woman can go about daily activities while having preterm contractions managed effectively for a period of time, such as the remainder of pregnancy.

Furthermore, the system described herein includes a structure that may avoid relying on the pressure of positioning a device against the vaginal sidewalls and pelvic bones for proper positioning. For example, the system described herein may include one or more balloons that instead rely on pressure on the vagina for proper positioning (e.g., of the sensing and modulating electrodes). Additionally, the system may instead be positioned on the cervical mucosa or cervix.

The electrical modulation described herein may also be applied to adult cardiac pacemakers, neurological stimulators (e.g., deep brain, spinal, etc.), or for pain relief. In some embodiments, the configurations disclosed herein may be used for electroceutical management of neonatal ductus arteriosus (relax/open or contract/close), electroceutical management of persistent pulmonary hypertension of the newborn, and electroceutical management of menstrual pain.

Preterm labor is a global problem. Yet, the ability to employ measures is often determined by available utilities and personnel. At least one embodiment of the muscle controller for low resource environments is depicted in FIGS. 14-17 and may be useful in environments where available utilities and personnel are low. An intravaginal muscle controller system may be scaled down to essential components to be applied by low level personnel. For example, it may include a catheter that is placed in the posterior fornix of the vagina, the pacemaker, dials and means of motivating them and the device can be worn or held in a pouch. The patient can crank the generator, or this can be done by an assistant. Solar panels can furnish storage in the contained battery to be used in an environment without convenient access to electricity.

Additionally, the structures and methods disclosed herein are embodiments designed to meet common clinical situations. For example, an embodiment described herein with an external, wearable pacemaker externally attached to the patient with a thin cable that is placed in the vagina is a configuration that is rapidly applicable to patients who are admitted in active PTL where the time to stop the contractions may be extremely short. On the other hand, in outpatients showing premonitory signs of low level uterine activity that over time may evolve into PTL, it may be beneficial to use an embodiment described herein that has a self-contained, battery operated housing that is placed intravaginally for periods of weeks to months. The function of the device may be monitored via distance readouts transmitted electronically to the caregiver.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory or computer-readable storage medium). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for monitoring and controlling uterine contractions using a uterine pacemaker and intravaginal electrode carrier through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A system for intravaginal control of uterine contractions, the system comprising:

an intravaginal electrode carrier comprising:
a housing having a surface, the housing structured for positioning the surface to be in contact with cervico-vaginal tissue of a patient;
a plurality of sensing electrodes arranged on the surface of the housing for measuring electroactivity data of a uterus of the patient via the cervico-vaginal tissue,
a plurality of modulating electrodes arranged on the surface of the housing for applying an electrical modulation signal to the uterus via the cervico-vaginal tissue; and
wherein the housing of the intravaginal electrode carrier comprises a ring designed to fit against the cervix, and the plurality of sensing electrodes and the plurality of modulating electrodes are placed in an alternating arrangement around a rim of the ring; and
a uterine pacemaker coupled to the intravaginal electrode carrier, the uterine pacemaker comprising:
a uterine monitor having one or more processors configured to receive the measured electroactivity data, and
an electroceutical generator having a waveform generator circuit electrically coupled to the one or more processors, the waveform generator circuit configured to:
generate, based on the measured electroactivity data, the electrical modulation signal; and
transmit the electrical modulation signal to the plurality of modulating electrodes.

2. The system of claim 1, further comprising a plurality of wires coupling the uterine pacemaker to the intravaginal electrode carrier, the uterine pacemaker being external to the body of the patient.

3. The system of claim 2, wherein the uterine pacemaker further comprises:
a manual trigger input configured to receive, from one or more of the patient or medical personnel, a manual trigger signal to modify the electrical modulation signal;
an electroceutical output configured to output the modified electrical modulation signal; and
a rechargeable battery.

4. The system of claim 3, wherein the uterine pacemaker further comprises a display electrically coupled to the electroceutical generator, the display configured to provide for display a plurality of parameters characterizing the electrical modulation signal.

5. The system of claim 4, wherein the uterine pacemaker further comprises:
one or more parameter control inputs configured to enable adjustment of the plurality of parameters; and
one or more light emitting diodes configured to indicate a status of operation of the uterine pacemaker.

6. The system of claim 3, wherein the uterine pacemaker is configured to be used in a low resource environment, the uterine pacemaker further comprising one or more photovoltaic cells and a crank configured for manual recharging of the rechargeable battery.

7. The system of claim 1, wherein the housing of the intravaginal electrode carrier further comprises a catheter with a tip designed to be positioned adjacent the cervix, the plurality of sensing electrodes and the plurality of modulating electrodes being arranged around the tip and connected to wires that run within the catheter and connect to the uterine pacemaker.

8. The system of claim 7, wherein the tip comprises a balloon configured to inflate to stabilize the plurality of sensing electrodes and the plurality of modulating electrodes in contact with the cervico-vaginal tissue.

9. The system of claim 7, wherein the tip comprises a local anesthetic dispenser configured to release an anesthetic to the patient.

10. The system of claim 1, wherein the intravaginal electrode carrier further comprises a plurality of balloon platforms coupled to the housing, the plurality of balloon platforms associated with a respective plurality of balloons configured to inflate to contact the lateral fornixes of the vagina of the patient to stabilize the plurality of sensing electrodes and the plurality of modulating electrodes in contact with the cervico-vaginal tissue, and configured to deflate for removal of the intravaginal electrode carrier from the patient.

11. The system of claim 1, further comprising:
an adaptor coupled to the uterine pacemaker and a medical personnel device, the adaptor comprising:
a plurality of medical personnel device inputs selected from an RS-232 port, a universal serial bus (USB) port, or a Bluetooth transceiver, wherein the adaptor is coupled to the medical personnel device via one of the plurality of pacemaker inputs, and
a uterine pacemaker output port configured to output supplementary uterine muscle activity data provided by the medical personnel device.

12. The system of claim 1, wherein the electrical modulation signal comprises a sequence of pulses, the sequence of pulses characterized by at least:
a duty cycle, wherein an increase in the duty cycle corresponds to inhibiting contractions and a decrease in the duty cycle corresponds to inducing contractions; and
an amplitude, wherein the amplitude varies with an electrical conductivity of the cervico-vaginal tissue.

13. The system of claim 12, wherein the sequence of pulses is biphasic charge balanced symmetrical, biphasic charge balanced asymmetrical, biphasic charge unbalanced asymmetrical, or polyphasic.

14. The system of claim 1, wherein the intravaginal electrode carrier is configured to administer the electrical modulation signal in conjunction with a pharmacological agent.

15. The system of claim 1, further comprising an override device coupled to the uterine pacemaker, the uterine pacemaker comprising an override input configured to receive patient-initiated instructions to modify operation of the uterine pacemaker.

16. The system of claim 1, further comprising a strap structured to fasten around the cervix of the patient, the strap coupled to the intravaginal electrode carrier.

17. The system of claim 1, wherein the uterine pacemaker further comprises a wireless communication circuit electrically coupled to one or more of the uterine monitor and the electroceutical generator, the wireless communication circuit configured to:
transmit the measured electroactivity data to a medical personnel device; and
receive, from the medical personnel device, instructions for adjusting the electrical modulation signal.

18. A system for intravaginal control of uterine contractions, the system comprising:
an intravaginally wearable device including:
an intravaginal electrode carrier comprising:
a housing having a surface, the housing structured for positioning the surface to be in contact with cervico-vaginal tissue;

a plurality of sensing electrodes arranged on the surface of the housing for measuring electroactivity data of a uterus, a plurality of modulating electrodes arranged on the surface of the housing for applying an electrical modulation signal to the uterus via the cervico-vaginal tissue, and wherein the housing of the intravaginal electrode carrier comprises a ring designed to fit against the cervix, and the plurality of sensing electrodes and the plurality of modulating electrodes are placed in an alternating arrangement around a rim of the ring; and a uterine pacemaker coupled to the plurality of sensing electrodes and the plurality of modulating electrodes, the uterine pacemaker comprising:

a uterine monitor having one or more processors configured to receive the measured electroactivity data, and an electroceutical generator having a waveform generator circuit electrically coupled to the one or more processors, the waveform generator circuit configured to:

generate, based on the measured electroactivity data, the electrical modulation signal; and transmit the electrical modulation signal to the plurality of modulating electrodes.

* * * * *